(12) United States Patent
Yazir et al.

(10) Patent No.: US 11,283,876 B2
(45) Date of Patent: Mar. 22, 2022

(54) SYSTEMS AND METHODS FOR END-TO-END REQUEST-RESPONSE FLOW ROUTING FOR GEOGRAPHICALLY DISTRIBUTED CLIENT DEVICES

(71) Applicant: Verizon Patent and Licensing Inc., Arlington, VA (US)

(72) Inventors: Yagiz Onat Yazir, Hollis, NH (US); Wujun Qie, Needham, MA (US); Ramanathan Subramaniam, Old Bridge, NJ (US); John F. Gallagher, Hopewell, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/825,602

(22) Filed: Mar. 20, 2020

(65) Prior Publication Data
US 2021/0297488 A1  Sep. 23, 2021

(51) Int. Cl.
*H04L 29/08* (2006.01)
*H04L 29/06* (2006.01)
*H04L 67/12* (2022.01)
*H04L 67/01* (2022.01)

(52) U.S. Cl.
CPC ............. *H04L 67/12* (2013.01); *H04L 67/42* (2013.01)

(58) Field of Classification Search
CPC ......... H04L 12/66; H04L 67/12; H04L 45/04; H04L 47/50; H04L 47/56; H04L 49/70; H04L 47/25; H04L 49/254; H04L 49/3018; H04L 49/3027; H04L 29/06; H04L 67/42; H04W 88/16; H04M 7/125
See application file for complete search history.

(56) References Cited

U.S. PATENT DOCUMENTS

| | | | | |
|---|---|---|---|---|
| 7,870,596 | B2* | 1/2011 | Schackow | G06F 21/53 726/1 |
| 8,954,591 | B2* | 2/2015 | Ganesan | H04L 67/24 709/227 |
| 10,885,028 | B2* | 1/2021 | Reyes | G06F 16/24532 |
| 10,917,260 | B1* | 2/2021 | Bashyam | G06F 16/183 |
| 2002/0071431 | A1* | 6/2002 | Kosajaru | H04L 12/56 370/389 |
| 2004/0088567 | A1* | 5/2004 | Lamotte | H04L 63/164 726/13 |

(Continued)

*Primary Examiner* — Backhean Tiv
*Assistant Examiner* — Linh T. Nguyen

(57) ABSTRACT

A first device may receive, from a first client device, a request for information from a second client device, wherein the second client device is connected to a second device that is geographically separated from the first device, and the first device is hosted in a first cloud computing environment and the second device is hosted in a second cloud computing environment. A first outbound routing agent associated with the first device may route the request to a second outbound routing agent associated with the second device, wherein the second outbound routing agent routes the request to the second client device to cause the second client device to generate a response. A first inbound routing agent associated with the first device may receive the response from a second inbound routing agent associated with the second device, and may provide the response to the first client device.

20 Claims, 17 Drawing Sheets

(56) References Cited

U.S. PATENT DOCUMENTS

| | | | |
|---|---|---|---|
| 2005/0041637 A1* | 2/2005 | Bialkowski | H04L 49/1515 370/351 |
| 2005/0108723 A1* | 5/2005 | Burckart | H04L 29/06 719/313 |
| 2005/0243817 A1* | 11/2005 | Wrenn | H04L 45/24 370/389 |
| 2008/0189757 A1* | 8/2008 | Schackow | H04L 63/20 726/1 |
| 2011/0082928 A1* | 4/2011 | Hasha | H04L 29/08333 709/224 |
| 2013/0007046 A1* | 1/2013 | Baum | G06F 13/4022 707/769 |
| 2013/0136116 A1* | 5/2013 | Viswanathan | H04L 65/1069 370/338 |
| 2013/0311643 A1* | 11/2013 | Kulkarni | H04L 47/283 709/224 |
| 2014/0330937 A1* | 11/2014 | O'Shea | H04L 67/1097 709/219 |
| 2015/0003247 A1* | 1/2015 | Mejia | H04L 45/22 370/235 |
| 2018/0359323 A1* | 12/2018 | Madden | H04L 12/4633 |
| 2019/0020637 A1* | 1/2019 | Andersen | H04L 29/06 |
| 2020/0036773 A1* | 1/2020 | Dar | G06F 9/45558 |
| 2020/0036811 A1* | 1/2020 | Dar | H04L 67/10 |
| 2020/0244770 A1* | 7/2020 | Cooley | H04L 41/5054 |
| 2020/0348662 A1* | 11/2020 | Celia | G05B 23/02 |
| 2020/0367074 A1* | 11/2020 | Zhang | G06N 20/00 |

* cited by examiner

SYSTEMS AND METHODS FOR END-TO-END REQUEST-RESPONSE FLOW ROUTING FOR GEOGRAPHICALLY DISTRIBUTED CLIENT DEVICES

BACKGROUND

Client devices are capable of moving between geographical regions within an area. Some client devices may be equipped with an array of sensors (e.g., temperature sensors, light sensors, power sensors and/or the like) through which the client devices collect information about surrounding environments. Such client devices typically have limited battery power, and may remain dormant in a power savings mode for a period of time. The client devices may wake up at particular time intervals (e.g., one or more minutes to an hour) to report sensor readings to other client devices and then may return to the power savings mode. The client devices with the sensors and the other client devices may be associated with individuals or entities (e.g., operators) that monitor the readings of the sensors. For example, a home owner may utilize a mobile client device (e.g., a smart phone) to monitor a temperature of a home captured by a client device (e.g., temperature sensor).

DETAILED DESCRIPTION OF PREFERRED EMBODIMENTS

Figure 1A:
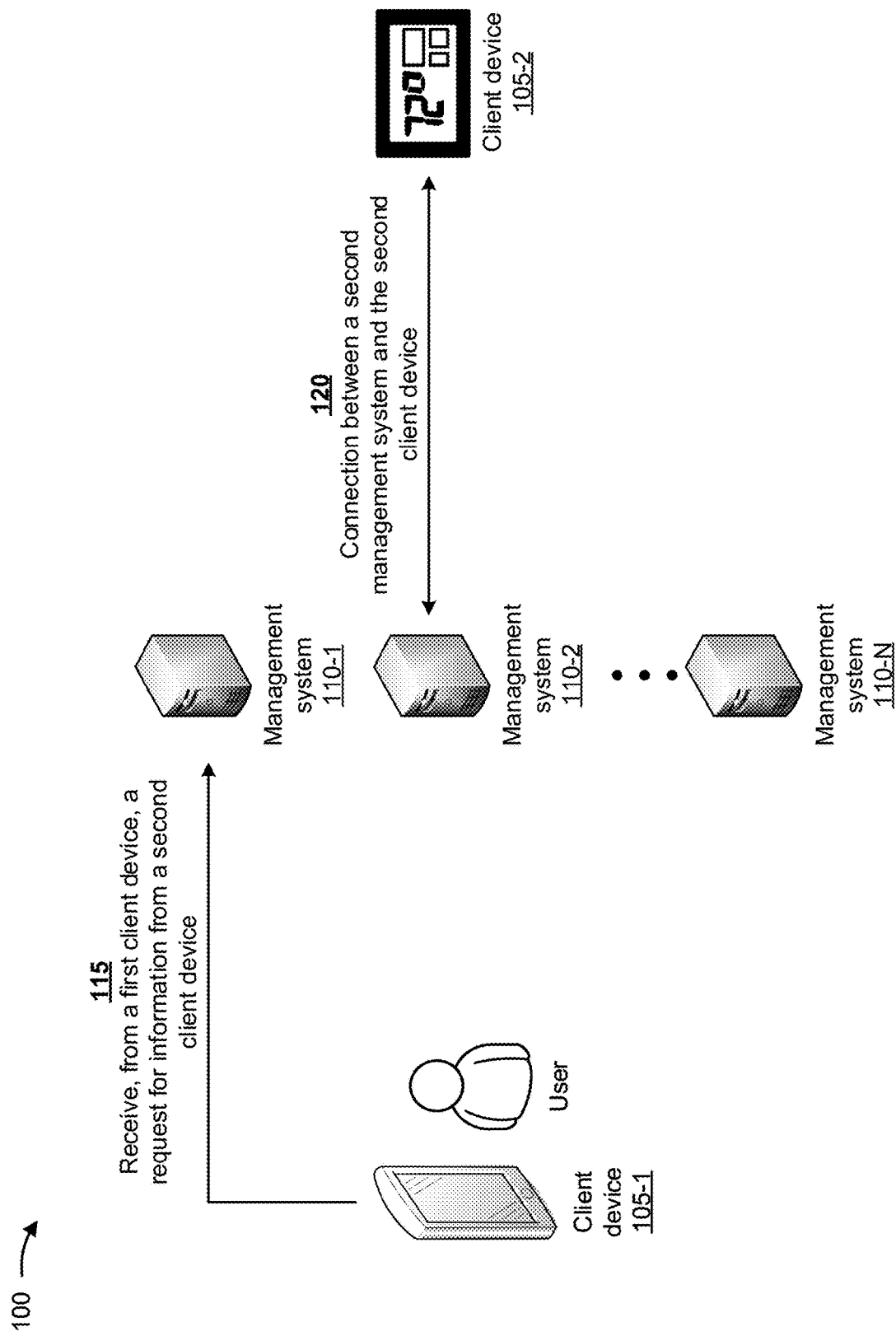
FIGS. 1A-1N are diagrams of one or more example implementations described herein.

The following detailed description of example implementations refers to the accompanying drawings. The same reference numbers in different drawings may identify the same or similar elements.

In addition to receiving the periodic sensor readings from client devices with sensors, client devices associated with operators may issue commands to the client devices with sensors in the form of requests. A request may cause a client device with sensors to generate a response to the request, and to provide the response to the client device that issued the request. A request may include a unique identifier (e.g., a universally unique identifier (UUID)) that is also associated with a corresponding response. A request-response flow may be triggered by an operator in order to retrieve certain client device properties (e.g., a device configuration, latest readings from specific sensors, and/or the like), to update certain client device properties (e.g., firmware, a length of time associated with a power savings mode, a length of time associated with awake periods, a reading frequency associated with specific sensors, and/or the like), and/or the like.

Information flows between a client device with sensors and a client device associated with an operator are mediated by a management system (e.g., a device that provides services via a stack of service layers). The client device with sensors and the client device associated with the operator may connect to the management system in order to communicate with one another. In order to serve geographically dispersed client devices, management systems may be deployed at multiple geographic locations. Since there are two information flows (e.g., unidirectional flows associated with unsolicited sensor readings initiated by the client devices with sensors, and bidirectional request-response flows initiated by client devices associated with operators), management systems may enable sensor readings to be viewed by the operators at any management system regardless of the management system through which the sensor readings are transmitted.

However, current management systems are unable to deliver a request issued by a client device associated with an operator towards a client device with sensors regardless of the management systems to which the client device associated with the operator and the client device sensors are connected. Current management systems are also unable to deliver a response issued by a client device with sensors to a management system from which a corresponding request originated (e.g., since the originating management system is aware of a uniquely identified request-response flow) regardless of a management system through which the client device with sensors initiates the response. Finally, current management systems are unable to deliver a request issued by a client device associated with an operator to a client device with sensors that reestablishes communications.

For example, current management systems operate autonomously (e.g., information stored in current management systems is not synchronized). Thus, if a first client device is connected to a first management system requesting sensor data from a second client device connected with a second, different management system, there does not exist a way to fulfill that request. If the two client devices are connected to a same management system, then the request may be satisfied. The issue arises when the two client devices are connected to different (e.g., geographically dispersed) management systems.

Thus, current management systems and client devices waste computing resources (e.g., processing resources, memory resources, communication resources), networking resources, and/or the like associated with generating requests that are never received, processing requests that are never received, generating responses that are never received, processing responses that are never received, and/or the like.

Some implementations described herein provide a management system that provides end-to-end request-response flow routing for client devices connected to geographically distributed management systems. For example, a first management system may receive, from a first client device, a request for information from a second client device, wherein the second client device is connected to a second management system that is geographically separated from the first management system, and wherein the first management system is hosted in a first cloud computing environment and the second management system is hosted in a second cloud computing environment. A first outbound routing agent associated with the first management system may route the request to a second outbound routing agent associated with the second management system, wherein the second outbound routing agent routes the request to the second client device, and wherein the request causes the second client device to generate a response to the request. A first inbound routing agent associated with the first management system may receive the response to the request from a second inbound routing agent associated with the second device, and provide the response to the first client device, wherein the response includes the information requested by the request.

In this way, the management system enables routing of end-to-end request-response flows for client devices connected to geographically distributed management systems. The management system delivers a request issued by a client device associated with an operator towards a client device with sensors regardless of the management systems to which the client device associated with the operator and the client device sensors are connected. The management system also delivers a response issued by a client device with sensors to a management system from which a corresponding request originated regardless of a management system through which the client device with sensors initiates the response. Finally, the management system delivers a request issued by a client device associated with an operator to a client device with sensors, at a later time when the client device with sensors reestablishes a connection. Thus, the management system conserves computing resources (e.g., processing resources, memory resources, communication resources), networking resources, and/or the like that would otherwise be wasted in generating requests that are never received, processing requests that are never received, generating responses that are never received, processing responses that are never received, and/or the like.

Figure 1B:
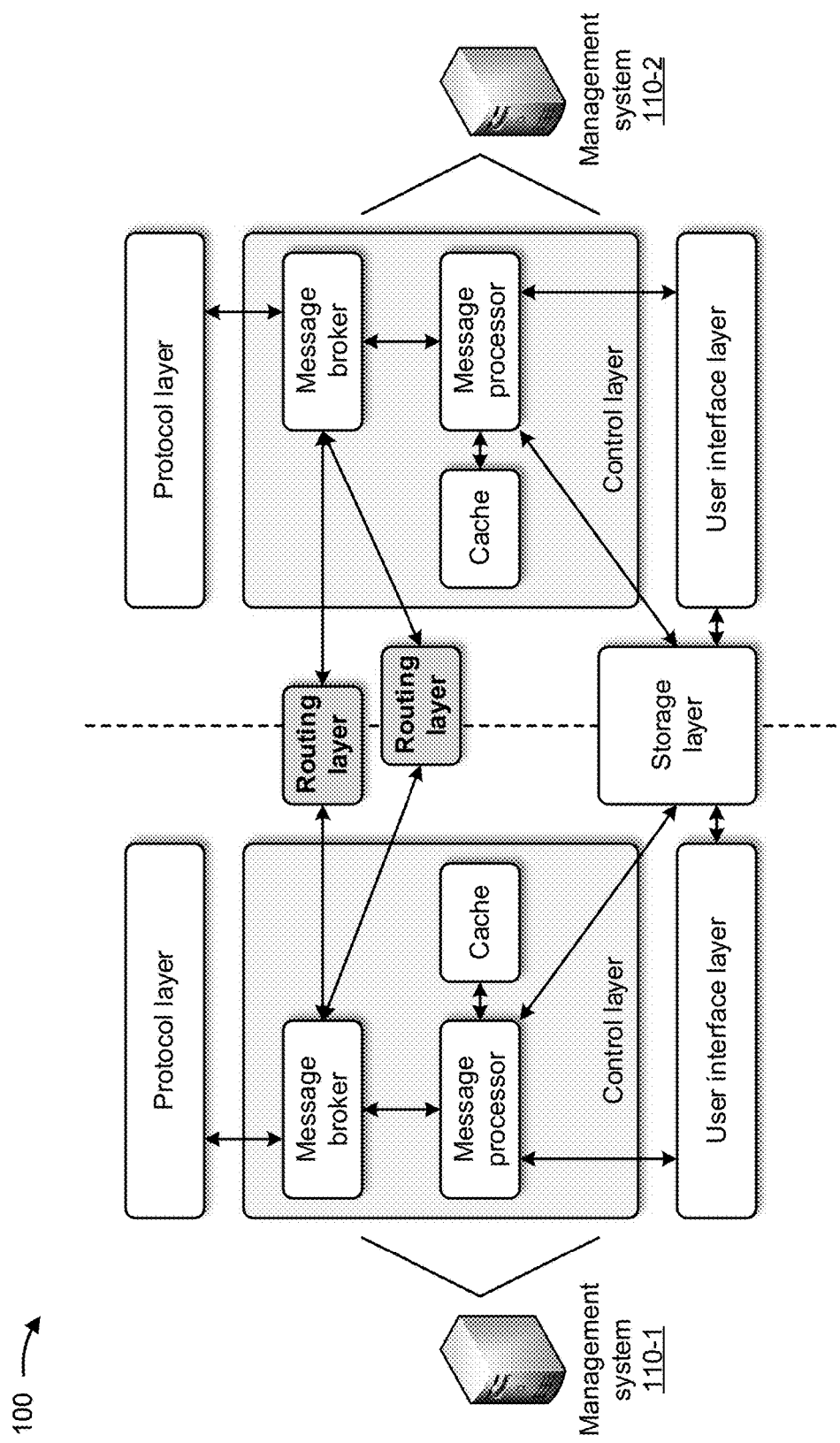
Figure 1C:
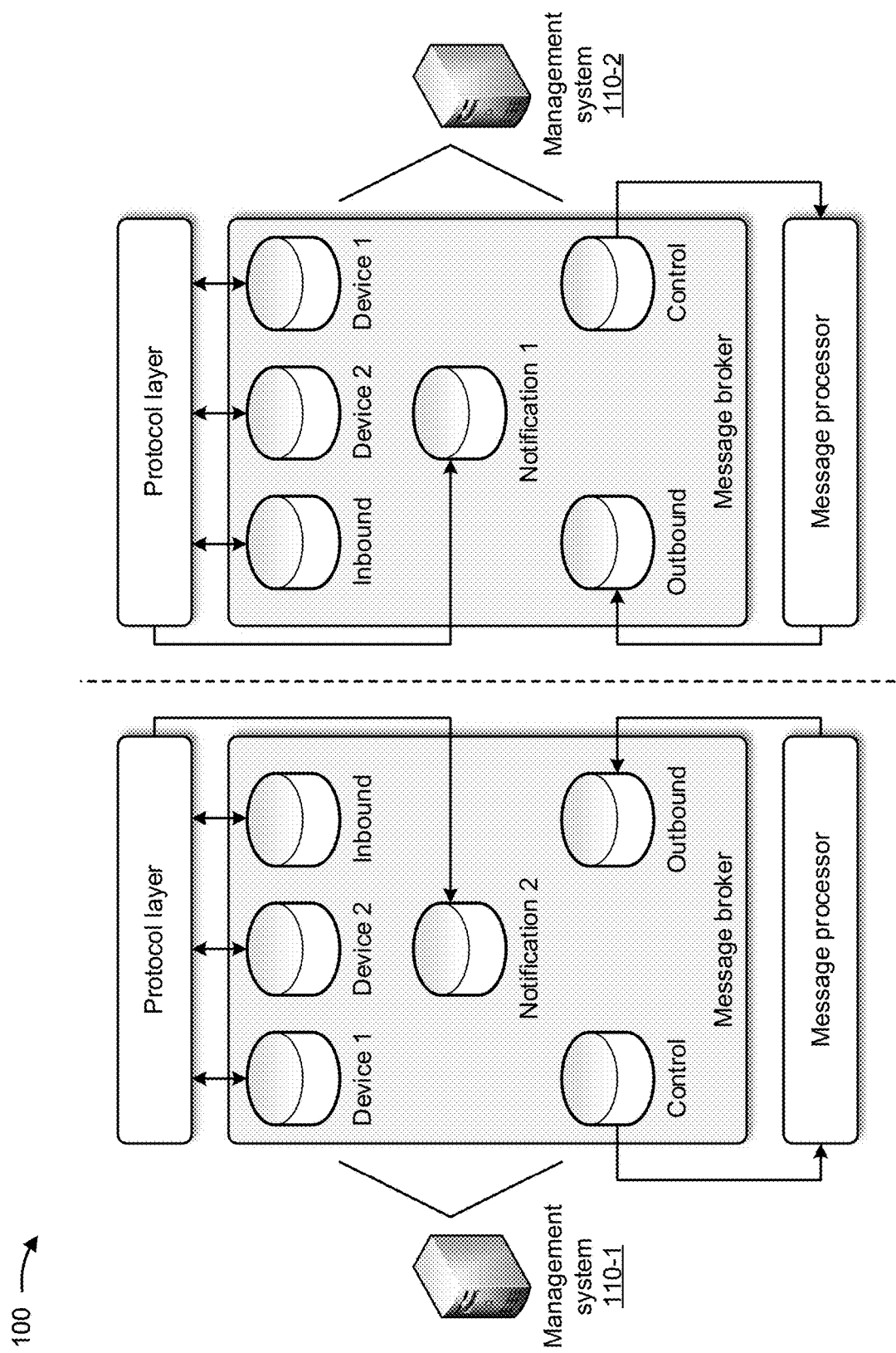
Figure 1D:
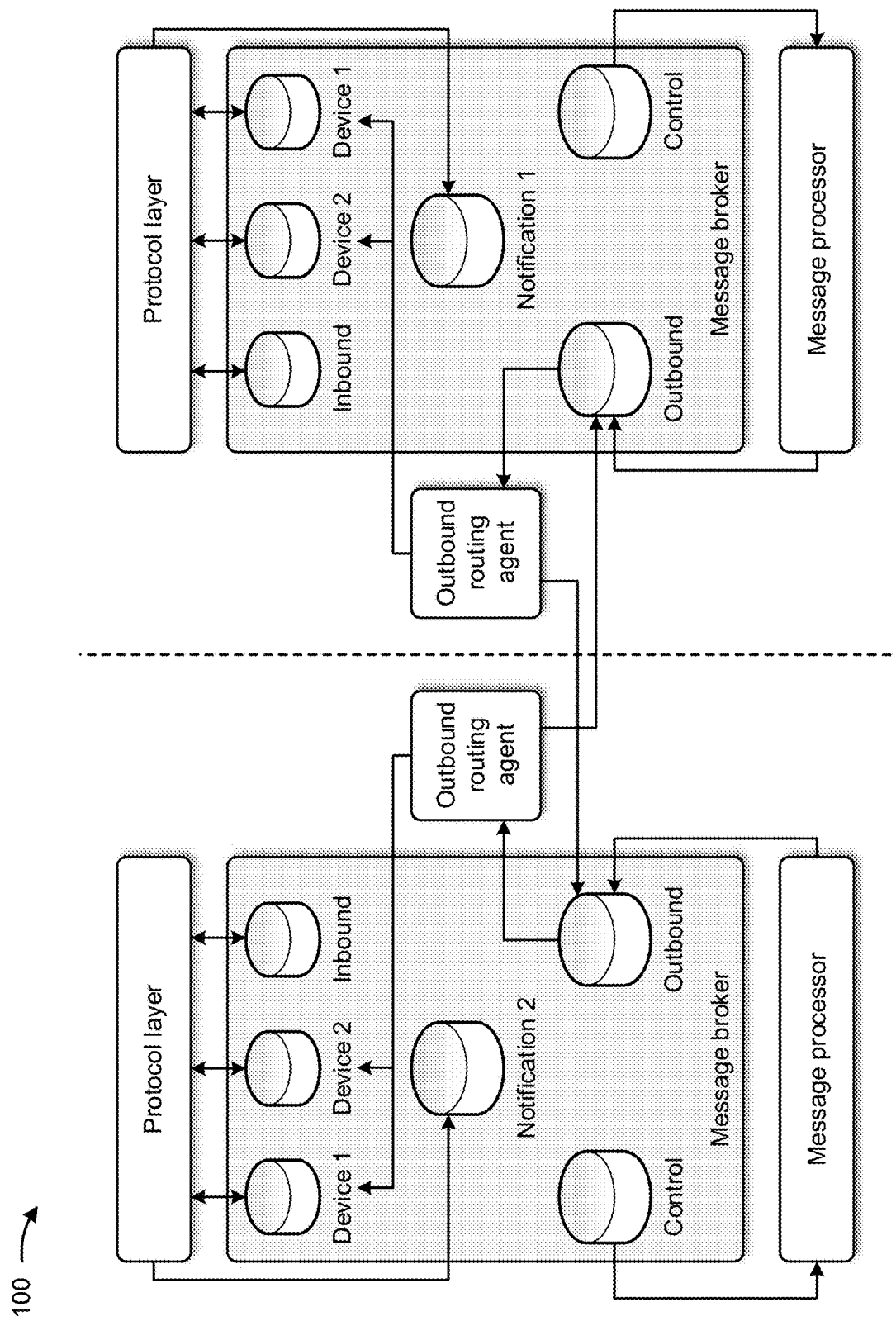
Figure 1E:
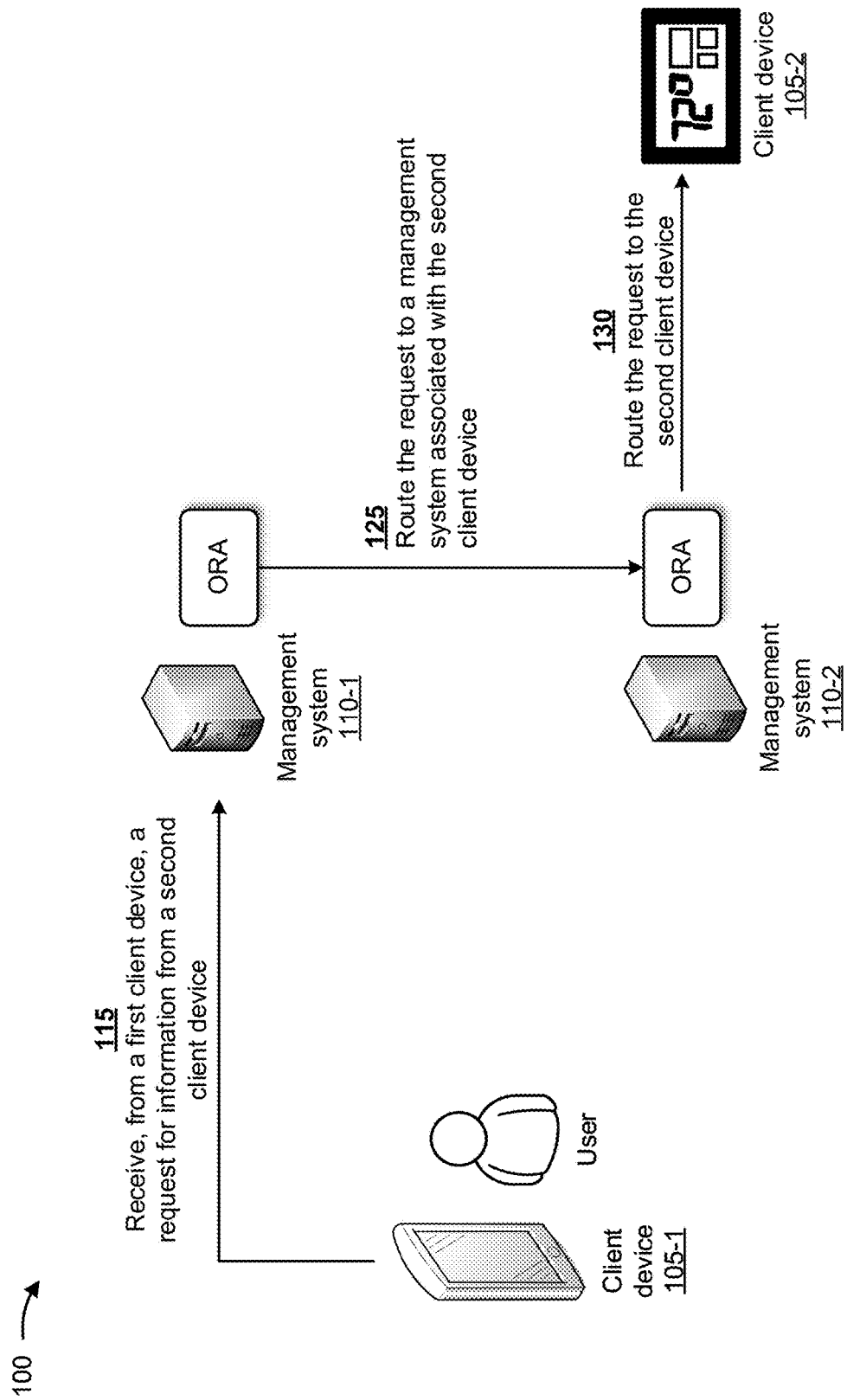
Figure 1F:
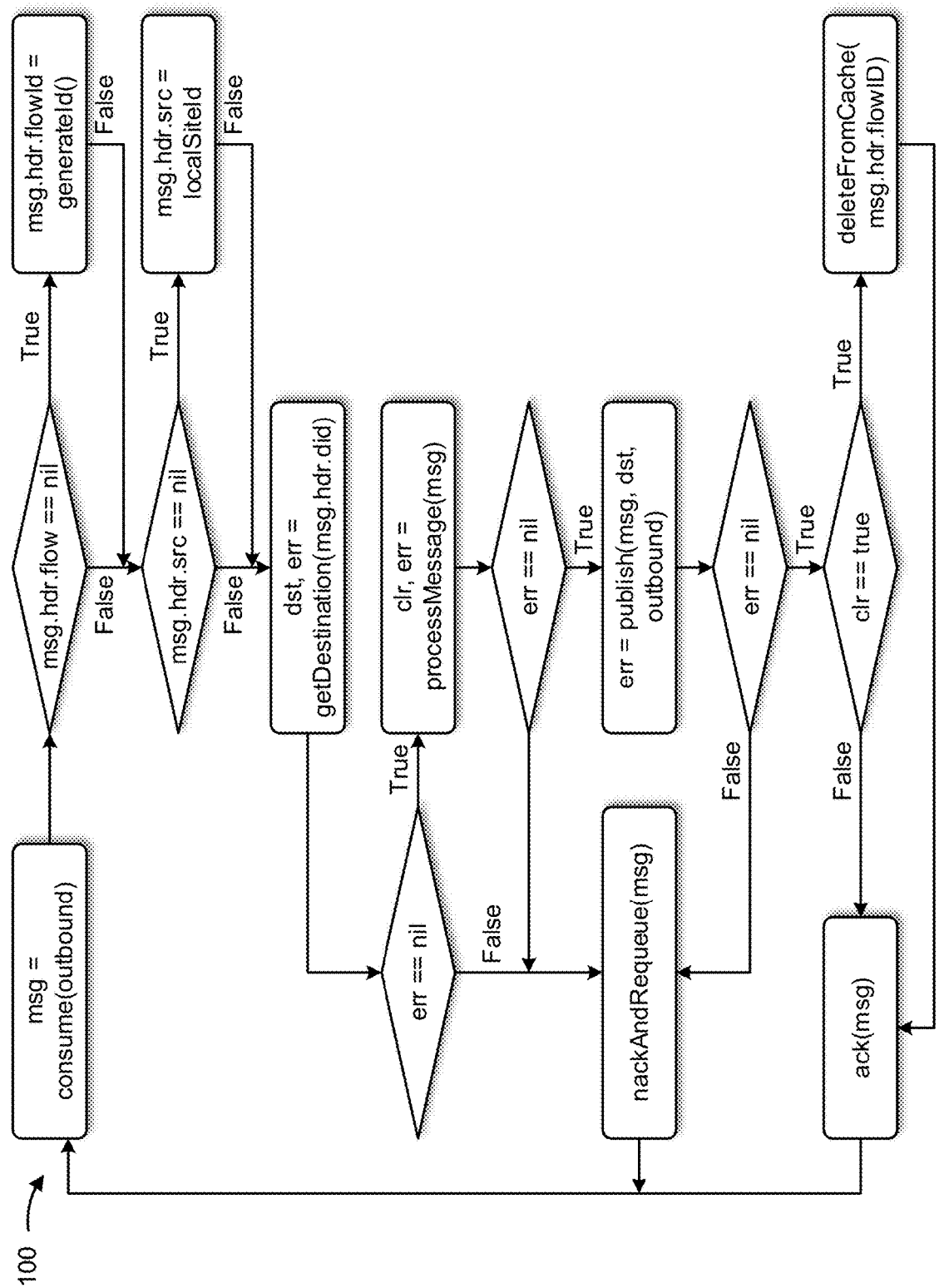
Figure 1G:
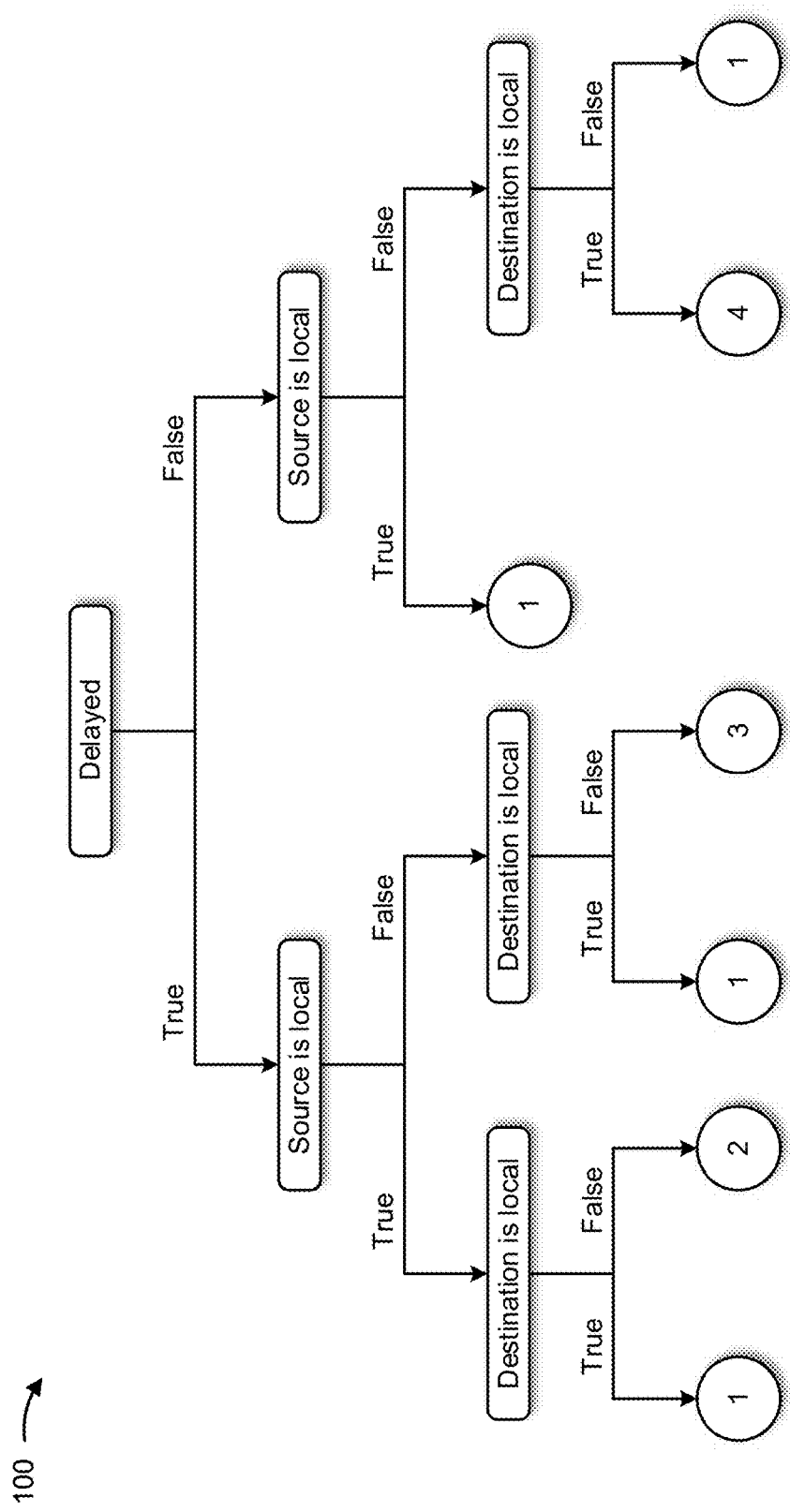
Figure 1H:
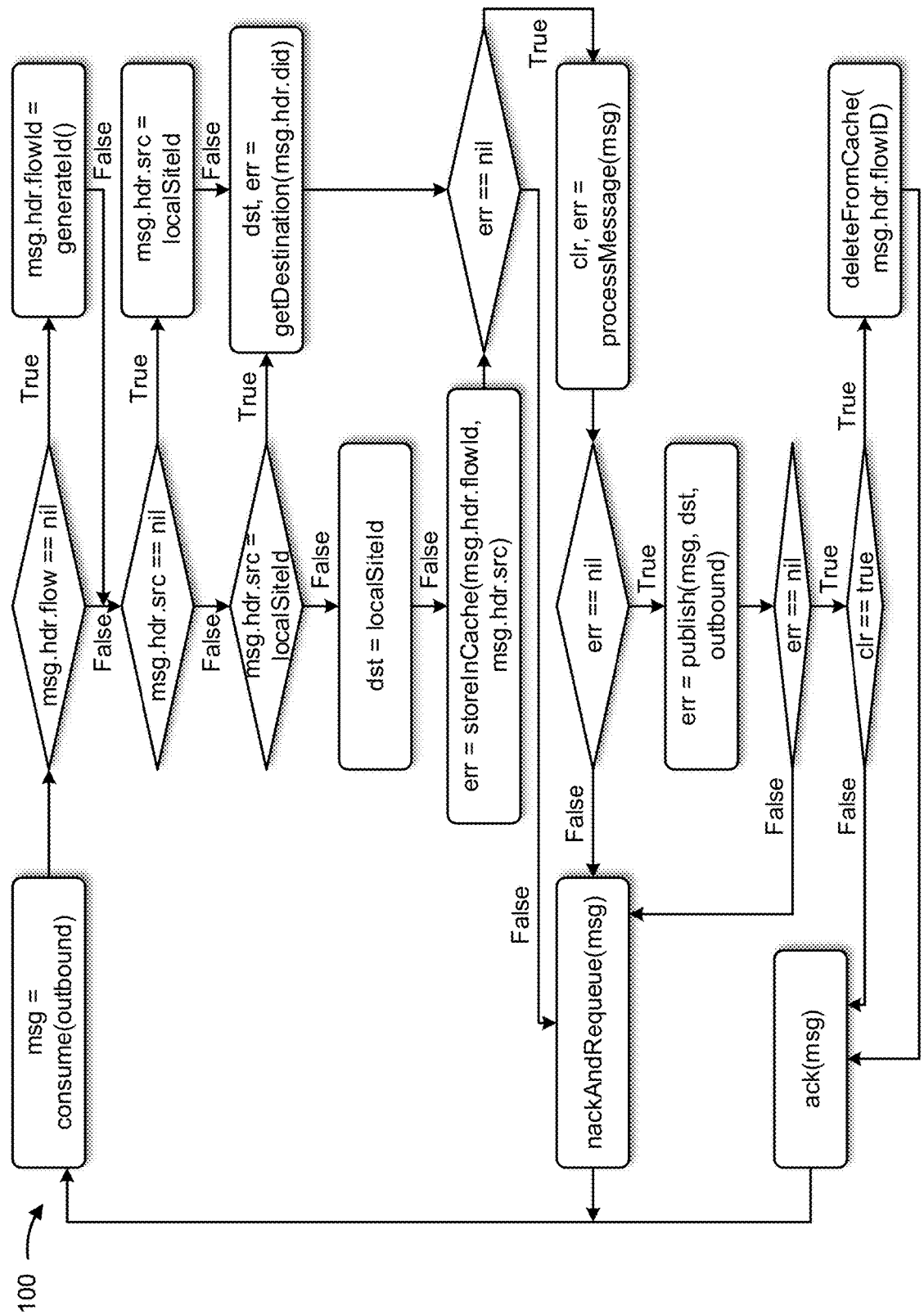
Figure 1I:
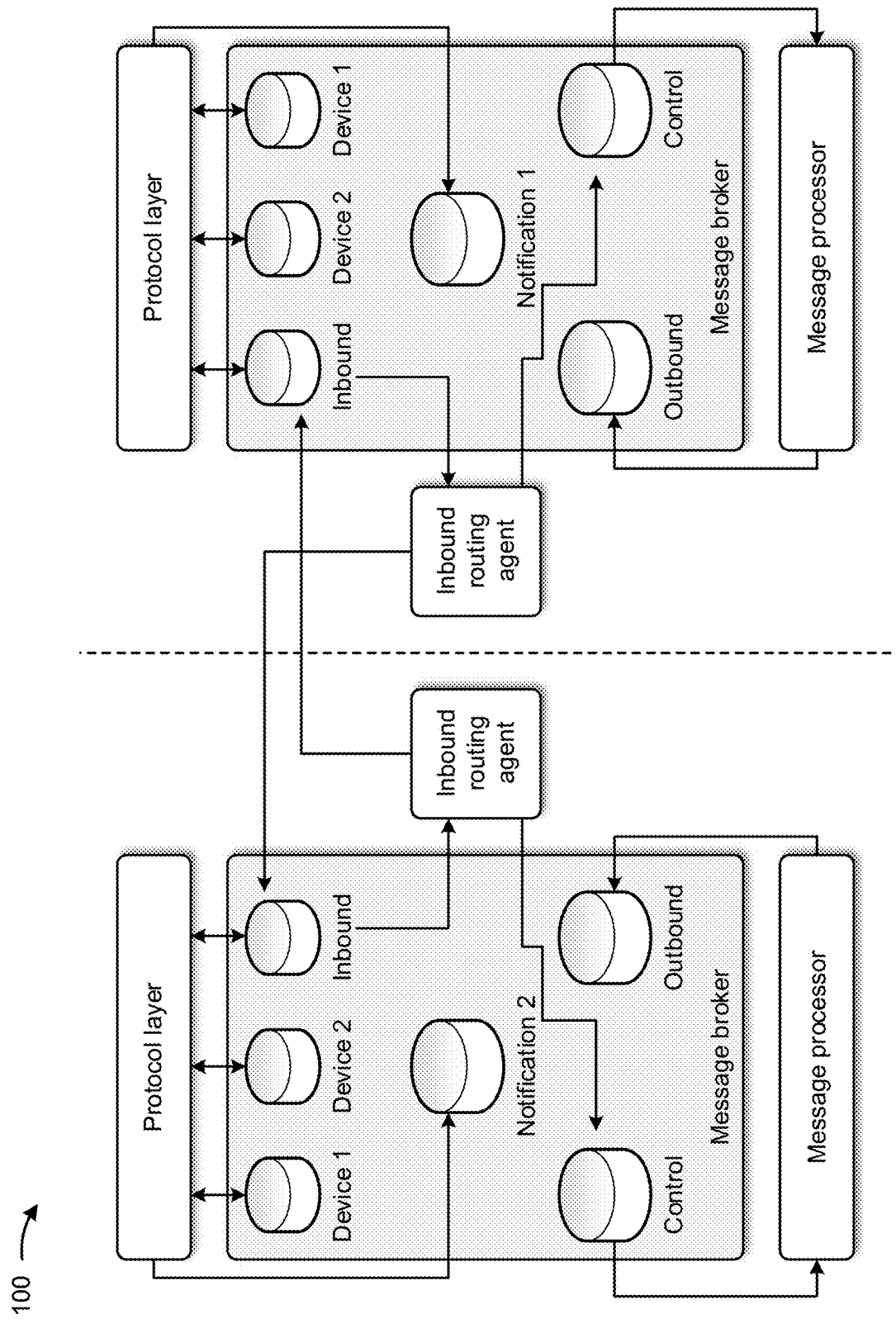
Figure 1J:
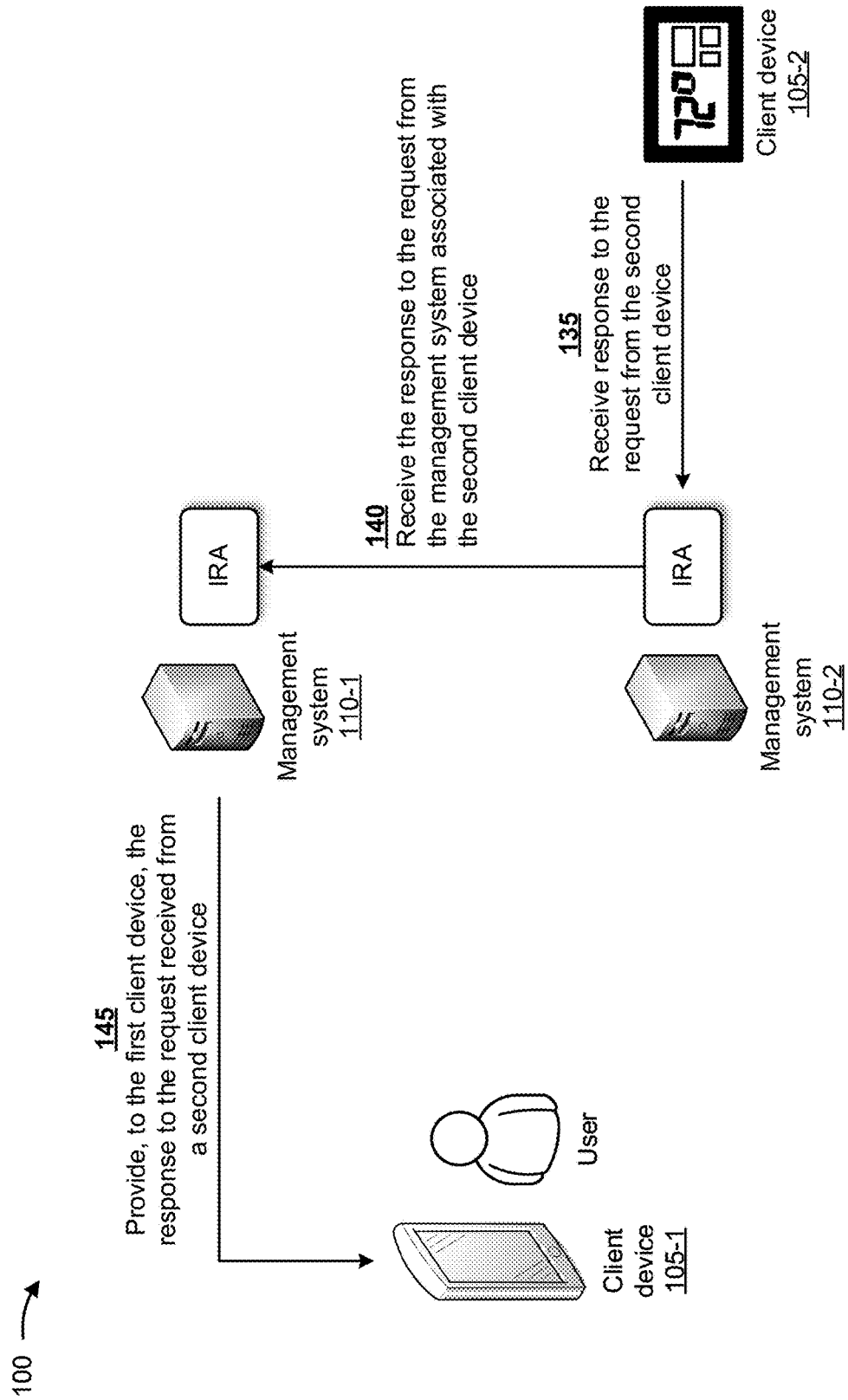
Figure 1K:
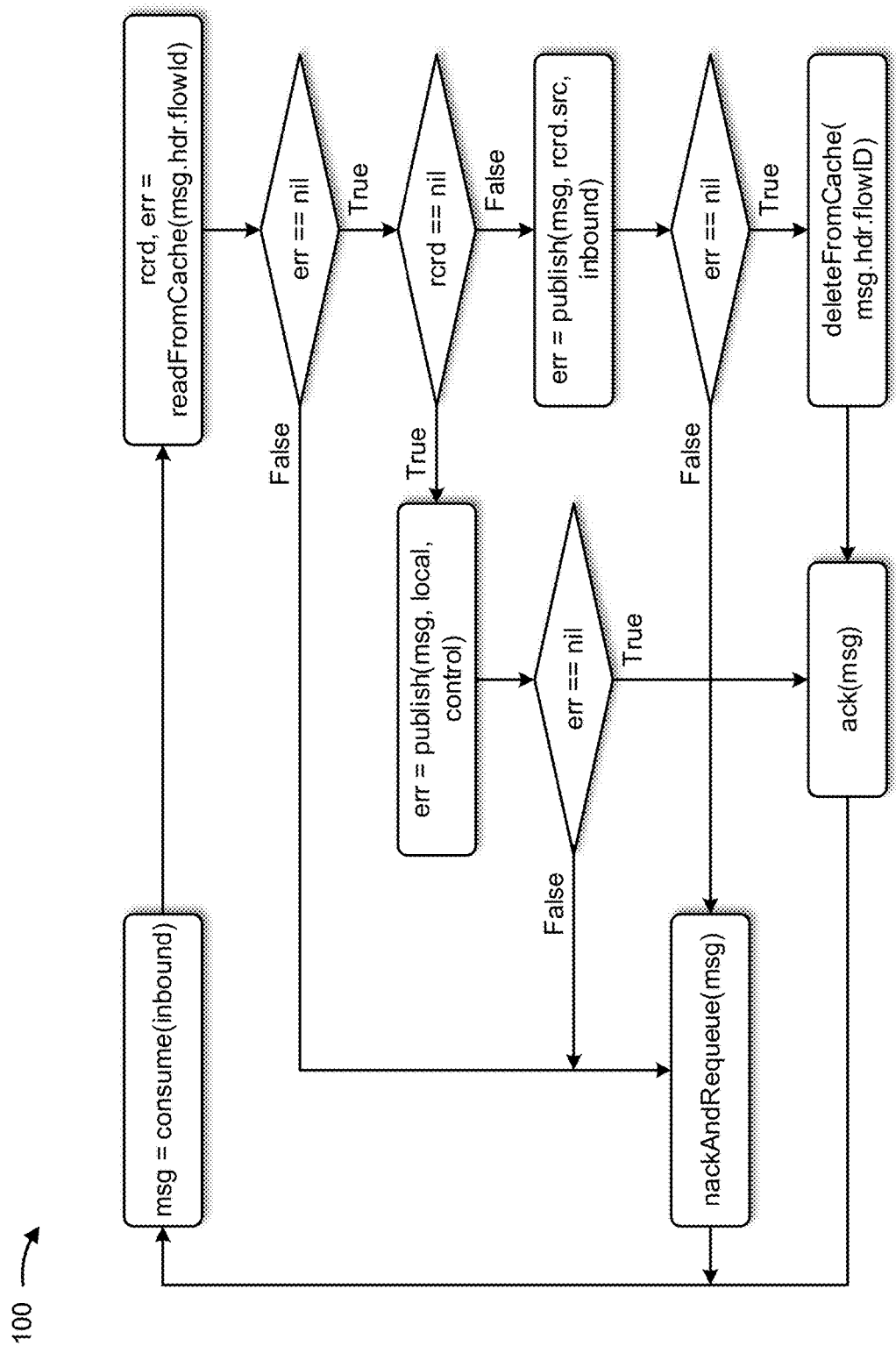
Figure 1L:
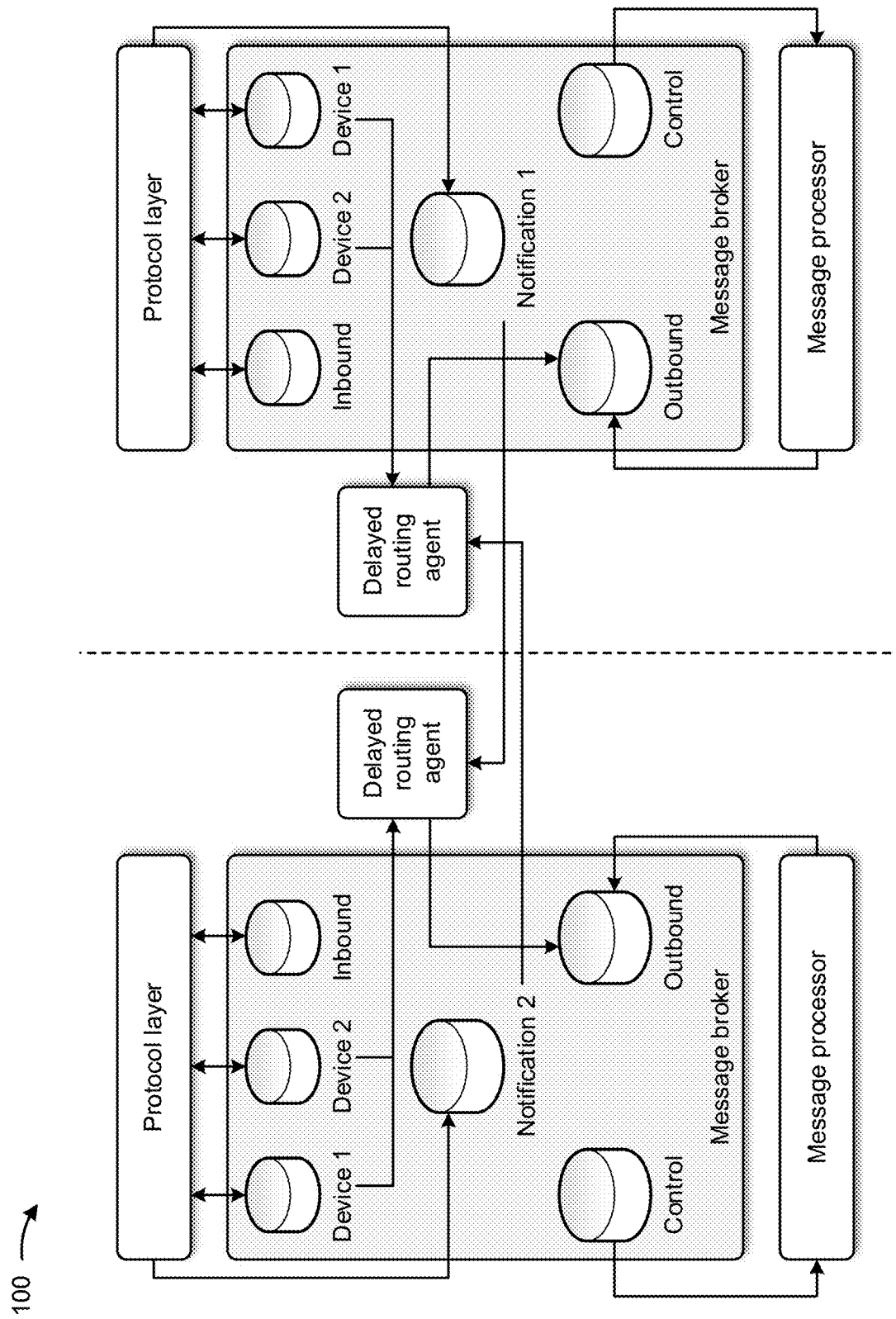
Figure 1M:
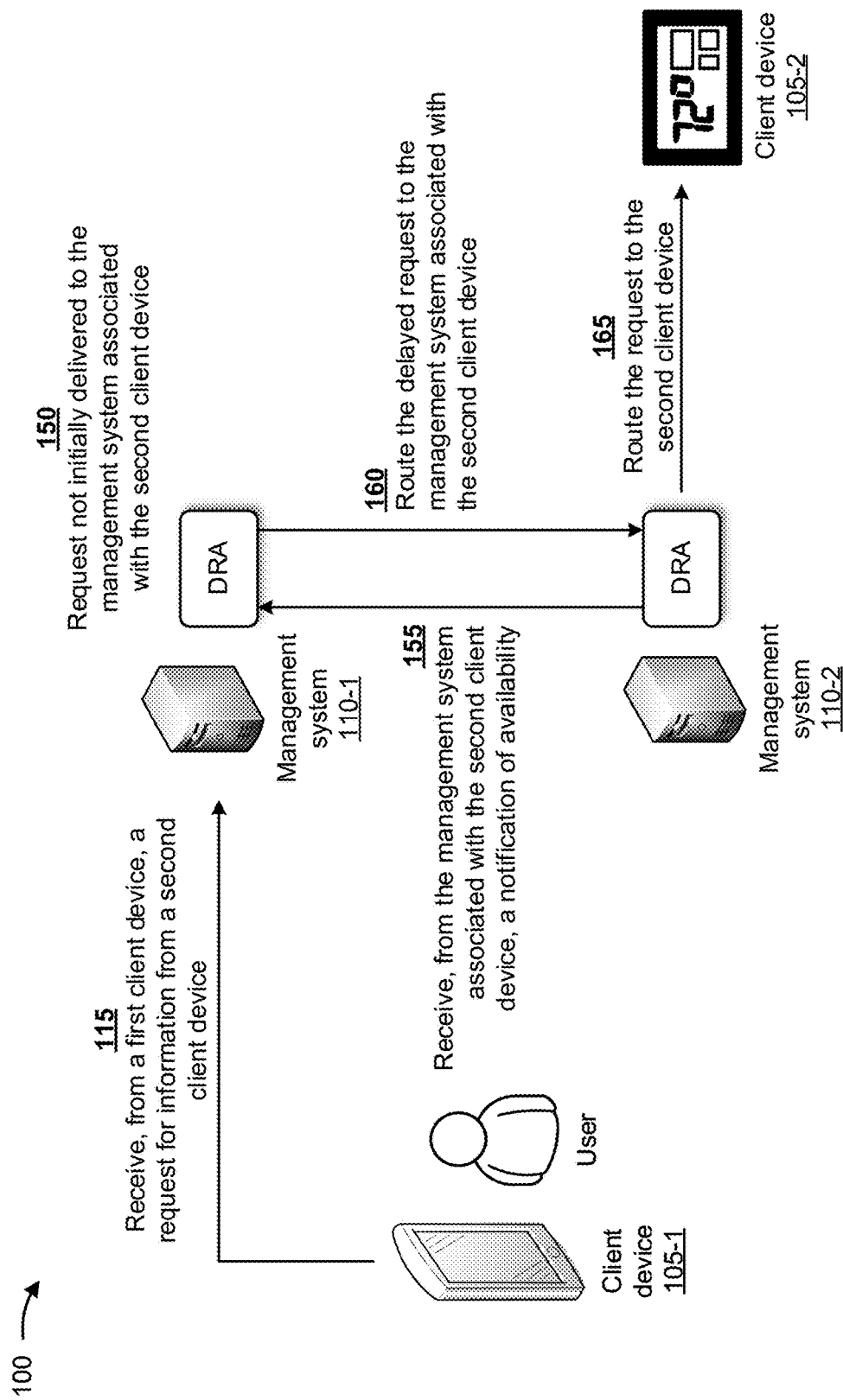
Figure 1N:
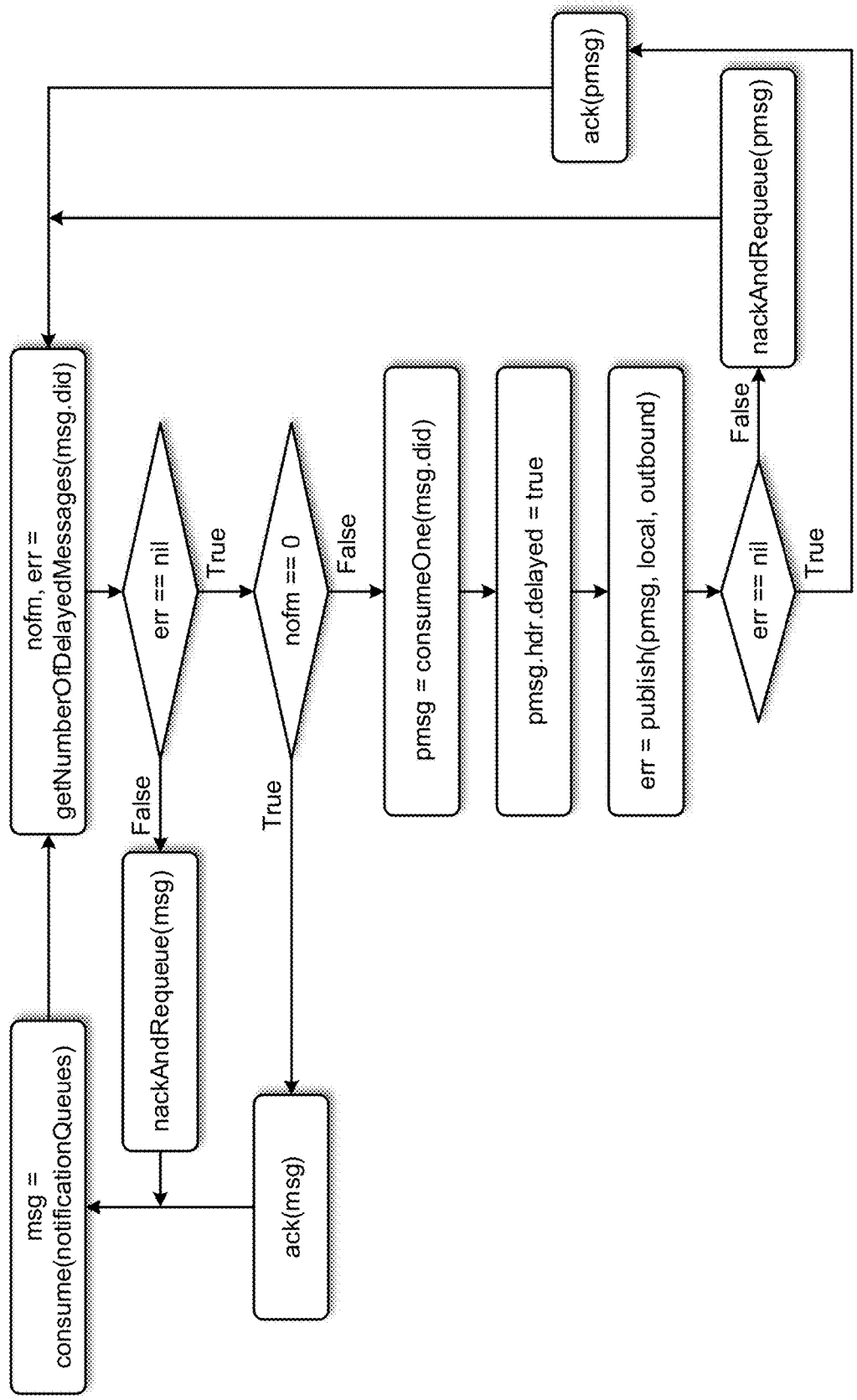

FIGS. 1A-1N are diagrams of one or more example implementations 100 described herein. As shown in FIG. 1A, client devices 105 (e.g., a first client device 105-1 and a second client device 105-2) may be associated with geographically-dispersed management systems 110 (e.g., a first management system 110-1, a second management system 110-2, through an Nth management system 110-N). Client devices 105 may include mobile devices, computers, telephones, set-top boxes, sensor devices, and/or the like. The first client device 105-1 may be associated with a user (e.g., an operator) that utilizes the first client device 105-1 to control the second client device 105-2, receive sensor readings from the second client device 105-2, and/or the like. The second client device 105-2 may include one or more sensors (e.g., a light sensor, a temperature sensor, a power sensor, and/or the like) that collect information about a surrounding environment of the second client device 105-2. Management systems 110 may include one or more server devices, one or more cloud computing environments, and/or the like that provide services (e.g., via stacks of service layers) to mediate information flows between the first client device 105-1 and the second client device 105-2. In some implementations, management systems 110 may provide end-to-end request-response flow routing for client devices 105 connected to geographically distributed management systems 110.

As further shown in FIG. 1A, and by reference number 115, first management system 110-1 may receive, from first client device 105-1, a request for information from second client device 105-2. As shown by reference number 120, a connection may be established between a second management system 110-2 and second client device 105-2. In some implementations, second management system 110-2 may be geographically separated from first management system 110-1. In some implementations, first management system 110-1 may be hosted in a first cloud computing environment and second management system 110-2 may be hosted in a second cloud computing environment. In such implementations, the first cloud computing environment may be geographically separated from the second cloud computing environment. In some implementations, first management system 110-1 may be hosted in a first data center and second management system 110-2 may be hosted in a second data center. In such implementations, the first data center may be geographically separated from the second data center. First client device 105-1 may be geographically local to first management system 110-1 but not to second management system 110-2, and second client device 105-2 may be geographically local to second management system 110-2 but not to first management system 110-1.

In some implementations, each of the management systems 110 may include a stack of service layers (e.g., a stack of services). A stack of services for each management system 110 may be the same as or similar to a stack of services for other management systems 110. Client devices 105 may connect to management systems 110 in order to communicate with other client devices 105. In order to serve client devices 105 at close proximity, management systems 110 may be deployed at a particular quantity of geographic locations. For example, two to six management systems 110 may be deployed at two, three, four, and/or the like geographic locations, and each client device 105 may connect to a management system 110 that is closest, geographically, to client device 105. In some implementations, management systems 110 may communicate with each other over a network (e.g., a virtual private network).

As shown in FIG. 1B, first management system 110-1 and second management system 110-2 may each include a stack of services that includes a protocol layer, a control layer, a storage layer, a user interface layer, and a routing layer. As further shown, the control layer may include a message broker, a cache, and a message processor, as described herein. In some implementations, the layers and services included in each management system 110 may interact with other layers and services that are deployed in a same management system 110.

The protocol layer may be modified. First, in order to support the routing layer functionality, the protocol layer may pool the messages coming from the devices in a new and intermediary queue through which the routing layer can intercept device responses. This intermediary queue may be referred to as an inbound queue. The protocol layer's original publish behavior may include pooling messages coming from the devices over a given communication protocol into the control queue from which the message processor consumes. Second, a new functionality is introduced in the protocol layer to ensure the remote routing agents are made aware of specific device connections at the local site. For this, the protocol layer may replicate and publish a message into a quantity of uniquely defined connection notification queues. These messages may be provided with a header field specifying the device that performed the connection on the protocol layer. Each unique connection notification queue may include a single routing layer consuming from it at a remote site. The message processor may be modified by changing the destination queue of each request. The message processor's original publish behavior may include sending messages directly to the device queues in the local site. In order to support routing layer functionality, the message processor may pool the messages coming from device operators in a new and intermediary queue through which the routing layer can intercept requests. This intermediary queue may be referred to as an outbound queue.

The protocol layer of each management system 110 may be located at the top of the stack of services within each management system 110, and may directly interact with client devices 105 using one or more communication protocols. In some implementations, each client device 105 may utilize a connection-oriented communication protocol above the transport layer, such as, for example, a simple (or streaming) text-oriented messaging protocol (STOMP), a message queueing telemetry transport (MQTT) protocol, and/or the like. The protocol layer may act as an interpreter between client devices 105 and the control layer by translating messages between the specific protocols used by client devices 105 and a more generic communication scheme that the control layer can process independently of the protocol used by client devices 105. The protocol layer may identify a client device 105 upon connection, and may receive and transmit messages from and to the control layer via the message broker acting on behalf of client device 105. The protocol layer may utilize a multi-instance deployment to facilitate high availability. However, the state of each instance of the protocol layer may be independent of the other instances of the protocol layer. For example, the protocol layer may not require the instances of the protocol layer to form a shared-state logical cluster, either in a single management system 110 or across multiple management systems 110.

The control layer of each management system 110 may be located in a middle of the stack of services of each management system 110, may act as a relay unit between the protocol layer and the user interface layer, and may act as a data processing unit. Additionally, the control layer may interact with the storage layer in order to trigger reads and writes of device specific information associated with client devices 105 (e.g., reading device credentials, writing processed or raw device readings, and/or the like).

The message broker of the control layer may be located between the protocol layer and the message processor of the control layer. The message broker may provide message relaying functionality for the control layer, and may provide a reliable mechanism for message persistence and delivery. Like the protocol layer, the message broker may utilize a multi-instance deployment. However, instances of the message broker may be required to form a shared-state logical cluster. Because the message broker may be deployed to facilitate availability and consistency, partition tolerance cannot be guaranteed according to the consistency, availability, and partition (CAP) theorem. The CAP theorem states that it is impossible for a distributed data store to simultaneously provide more than two of consistency (e.g., every read receives a most recent write or an error), availability (e.g., every request receives a (non-error) response, without a guarantee that it contains a most recent write), and partition tolerance (e.g., the system continues to operate despite an arbitrary quantity of messages being dropped or delayed by a network between nodes). As a probability of cluster partitioning increases significantly over wide area networks (WANs) due to increased packet loss and latency, each message broker may be state-wise independent from other message brokers of other management systems 110.

The cache of the control layer may be used by other control layers to store and retrieve non-critical state information. The cache may include a multi-instance deployment with logical clustering. As the cache may have the same availability and consistency requirements as the message broker, each cache may be state-wise independent from other caches of other management systems 110.

The message processor of the control layer may relay messages initiated from the user interface layer to the message broker. Additionally, the message processor may collect messages generated by the protocol layer from the message broker, and may process and store a result of the process via the storage layer. The message processor may utilize the cache to store and retrieve state information, and may utilize a multi-instance deployment to facilitate high availability. However, state information of each message processor may be independent of state information of other message processors. For example, the message processor may not require the other message processors to form a shared-state logical cluster, either in a single management system 110 or across multiple management systems 110.

In first management system 110-1 of FIG. 1B, the message broker may make available logical constructs (e.g., messages), may enhance the messages via arbitrary message headers and queues, and may perform create-read-update-delete (CRUD) operations and read-write operations via publish-consume calls. Communications between the protocol layer and the message processor may be mediated through a set of queues served by the message broker. For example, there may be a unique queue for each client device 105, and an identifier of each queue may be coupled with an identifier of client device 105. The message processor may place messages intended for a particular client device 105 in a specific queue, in the message broker, that is associated with the particular client device 105. Information stored within the message broker may be delivered, by the protocol layer, to the particular client device 105. Messages received from client devices 105 may be pooled in a single control queue in the message broker, by the protocol layer, and may be stored by the message processor.

The storage layer of each management system 110 may serve read and write requests coming from the message processor in the control layer and from the user interface layer. The storage layer may provide an underlying persistent storage mechanism that functions as a logical cluster across all management systems 110 by globally deploying and managing copies of data. The stored data may include processed sensor readings of client devices 105 with sensors (e.g., such as second client device 105-2) to be viewed by operators of client devices 105 (e.g., such as first client device 105-1).

The user interface layer of each management system 110 may provide operators of client devices 105 (e.g., first client device 105-1) with representations of data collected by other client devices 105 (e.g., second client device 105-2), and may provide the operators of client devices 105 with the ability to generate requests, via the control layer, from the other client devices 105. The user interface layer may utilize a multi-instance deployment to facilitate high availability. However, a state of each user interface layer may be independent of states of other user interface layers. For example, the user interface layer may not require the user interface layer to form a shared-state logical cluster, either in a single management system 110 or across multiple management systems 110.

The routing layer of each management system 110 may employ multiple routing agents. As described herein, the routing agents may include an outbound routing agent (ORA), an inbound routing agent (IRA), a delayed routing agent (DRA), and/or the like. The routing agents may collaborate with other routing agents of the routing layer within a management system 110, and with routing agents of routing layers in other management systems 110, to ensure that request-response flows are successfully completed. The routing agents may ensure request-response flows are successfully completed by delivering requests to client devices 105 regardless of a connection status or a location of client devices 105, and by delivering a response associated with each request to management system 110 associated with the request, regardless of a location of management system 110.

In some implementations, the routing layer may perform operations on a group of queues served by the message brokers on all management systems 110. For example, the routing layer may be implemented based on customization of an existing queue architecture, which may require compliance from the existing services on each management system 110 with respect to interactions with local message brokers. In an architecture where a limited quantity of services other than the routing layer (e.g., the protocol layer and the message processor) communicate with the message broker at management system 110, publish or consume behavior may be adjusted accordingly. In some implementations, the routing layer may define and utilize routing header fields for messages in order to support decisions made by each routing agent. For example, the routing header fields may include a delayed header, a source header, a flow identification header, a device identification header, and/or the like.

The delayed header may be used for communication among routing agents that are deployed in a same management system 110. In some implementations, a request may be marked as delayed by a DRA, and a delayed request may be received by an ORA at the same management system 110 as the DRA that marked the request as delayed. A request that is marked as delayed may indicate that the request was previously processed in a local management system 110 for routing but was not delivered to an intended client device 105 (e.g., due to client device 105 being disconnected or otherwise unavailable before the request is delivered), and that the request needs to be rerouted due to a new connection of the intended client device 105 another management system 110. Additionally, the ORA associated with the DRA that marked the request as delayed may can unset the delayed header.

The source header may be used for communication among the routing agents that are deployed in different management systems 110. The source header may include an identifier associated with management system 110 from which a request originated. In some implementations, the ORA, deployed in a same management system 110 as the message processor that initiated a request-response flow, may process a request in which the source header is not set. Additionally, the source header of a request may be set to a value by the ORA deployed in the same management system 110 as the message processor that initiated the request-response flow.

The flow identification header may identify and cache request-response flows in order to support routing decisions made by the routing agents across all management systems 110. In some implementations, the flow identification header may be set to a value by the ORA deployed on a management system 110 from which a request originated, and may be read and used by ORAs across all management systems 110 and the IRA of a management system 110 to which the request is responded. Alternatively, the setting of the flow identification header may be performed by the message processor if identification of a request-response flow is related to the message processor. In such cases, the outbound routing agents across all management systems 110 may read the flow identification header for routing decisions.

The device identification header may uniquely identify client device 105 to which a request is to be sent. The device identification header may be set by the message processor from which a request originates or by the protocol layer that encounters a device connection, and may be read and used by the ORAs and the DRAs across all management systems 110 to locate a connection status and a queue state of the identified client device 105 in order to make routing decisions.

As described herein, in a multiple management system architecture that utilizes two communication patterns (e.g., unidirectional unsolicited sensor readings initiated by client devices 105, and bidirectional request-response flows initiated by and completed by client devices 105), the routing layer may enable a request generated by first client device 105-1 and destined for second client device 105-2 with an active connection to be delivered to second client device 105-2 regardless of management systems 110 to which first client device 105-1 and second client device 105-2 are connected. Furthermore, the routing layer may enable a response issued by second client device 105-2 to be delivered to first management system 110-1 associated with first client device 105-1 (e.g., since first management system 110-1 is aware of the uniquely identified request-response flow) regardless of a management system 110 associated with second client device 105-2. Additionally, the routing layer may enable a request generated by first client device 105-1 and destined for second client device 105-2 at a time when second client device 105-2 is disconnected to be persisted and delivered at a later time when second client device 105-2 re-establishes a connection regardless of management systems 110 to which first client device 105-1 and second client device 105-2 are connected.

Without the routing layer, a message delivered to a device queue on one management system 110 cannot be received by an intended client device 105 at another management system 110 unless the message is explicitly routed to the device queue of the intended client device 105 at the other management system 110. Furthermore, an origin of a request-response flow must be available at a management system 110 where a response is received, so that the response may be directed to the origin of an associated request. The origin of a request-response flow can be tagged with a unique identification assigned to the request-response flow. The information for each active request-response flow needs to be available across all management systems 110 in order for a request generated by first client device 105-1 and destined for second client device 105-2 at a time second client device 105-2 is disconnected to be persisted and delivered later when second client device 105-2 re-establishes a connection regardless of a management system 110 to which second client device 105-2 establishes the connection. A conventional caching system may not be used for this purpose as a conventional caching system cannot be deployed as a single logical cluster spanning all management systems 110, and a conventional storage layer may not be used for applications that require strict consistency.

As shown in FIG. 1C, the message brokers of first management system 110-1 and second management system 110-2 may each include an inbound queue, device queues (e.g., device 1, device 2, and/or the like) associated with corresponding client devices 105 (e.g., first client device 105-1, second client device 105-2, and/or the like) connected to first management system 110-1 and second management system 110-2, a connection notification queue (e.g., notification 1, notification 2, and/or the like), a control queue, and an outbound queue. The inbound queue may include an intermediary queue through which the routing layer can intercept and store responses from client devices 105. This may permit the protocol layer to pool messages coming from client devices 105 in the inbound queue in order to support functions of the routing layer. The device queues may include queues through which the routing layer can intercept and store requests from client devices 105.

The message broker may replicate and publish a message into a quantity of uniquely defined connection notification queues (e.g., notification 2 in management system 110-1 and notification 1 in management system 110-2) to ensure that remote routing agents are made aware of specific device connections at a local management system 110. The messages may include a header field specifying a client device 105 that performed the connection on the protocol layer. Information in each unique connection notification queue may be received from a routing layer at a remote management system 110. The control queue may include a queue that stores messages coming from client devices 105 and provides the messages to the message processor. The outbound queue may include an intermediary queue through which the routing layer can intercept requests from client devices 105. This allows the message processor to pool the messages coming from client devices 105 in the outbound queue in order to support functions of the routing layer.

As shown in FIG. 1D, a routing layer of each management system 110 may employ an ORA. The ORA may intercept messages from the outbound queue of the message broker of a local management system 110 and may determine, for each message, to which management system 110 the message is to be delivered. Based on the determination, the ORA may either route the message to an intended device queue in the local management system 110, or may route the message to an outbound queue of a remote management system 110 (e.g., which may be received by the ORA located at the remote management system 110). In some implementations, the ORA may also interact with the cache located at a local management system 110 to support inbound message routing. In some implementations, the messages include respond flags, request flags, and/or the like that enables intermediate servers to process the respond flags, the request flags, and/or the like.

As shown in FIG. 1E, and by reference number 115, the ORA of first management system 110-1 may receive, from first client device 105-1, the request for information from second client device 105-2. For example, the ORA of first management system 110-1 may receive the request from the device queue (e.g., device 1) of first management system 110-1.

As further shown in FIG. 1E, and by reference number 125, the ORA of first management system 110-1 may route the request to the ORA of second management system 110-2. For example, the ORA of first management system 110-1 may analyze the request (e.g., and information included the request when the message is intercepted and decorated) and may determine that a destination of the request is second client device 105-2, which is associated with second management system 110-2. Thus, the ORA of first management system 110-1 may provide the request to the outbound queue of second management system 110-2 based on the destination of the request. The ORA of the second management system 110-2 may receive the request from the outbound queue of the second management system 110-2.

As further shown in FIG. 1E, and by reference number 130, second management system 110-2 may route the request to second client device 105-2. The ORA of second management system 110-2 may analyze the request and may determine that a destination of the request is second client device 105-2 based on analyzing the request. The ORA of second management system 110-2 may provide the request to the device queue (e.g., device 2) of second management system 110-2 since the device queue (e.g., device 2) is associated with second client device 105-2. The device queue may then route the request to second client device 105-2, via the protocol layer.

As shown in FIG. 1F, an ORA may follow a logical flow throughout the process of routing. ORAs across all management systems 110 may collaboratively deliver requests, regardless from which management system 110 a request originates, to client devices 105, regardless of a management system 110 to which a client device 105 is connected. This may be accomplished by the ORAs routing requests to other ORAs until the requests are delivered to management systems 110 to which client devices 105 are connected. An ORA may route a request to another ORA by publishing the request to the outbound queue located at and served by the message broker of a management system 110 of the other ORA.

Once successfully initiated, the ORA starts receiving requests from the outbound queue served by a local message broker. Upon receiving a request, the ORA first checks whether the flow identification header of the request is set (e.g., msg.hdr.flow==nil). If the flow identification header of the request is set (e.g., msg.hdr.flow==nil is False), this means that the flow identification assignment is handled by the message processor. If the flow identification header of the request is not set (e.g., msg.hdr.flow==nil is True), this means that the flow identification assignment is handled by the routing layer. In this case, the ORA randomly generates an identifier (e.g., msg.hdr.flowId=generateId( )) and stores the identifier in the flow identification header of the request. The ORA then checks the source header (e.g., msg.hdr.src==nil). If the source header is not set (e.g., msg.hdr.src==nil is True), this means the request is generated by the local message processor, and is being processed locally for routing for the first time. In order to add an indication of origin to the request, the ORA sets the source header to the identifier of the local management system 110 (e.g., msg.hdr.src=localSiteId). In the case where the source header is already set, regardless of its value, this means that the request originated from one of management systems 110 (e.g., local or remote) in the deployment, and was previously processed in at least one management system 110 (e.g., local or remote), and does not need to be modified locally by the ORA.

After the source header of the request is processed, the ORA proceeds by deciding the management system 110 to which the request will be routed. In order to make the decision, the status of the queue that belongs to the client device 105 for which the request is intended in all deployment management systems 110 (e.g., local and remote) is determined. To determine the status, the ORA extracts the device identification header from the request (e.g., dst, err=getDestination(msg.hdr.did)). The extracted information is then used to construct a name of the device queue. The constructed device queue name is enveloped in a queue inspection request and sent to the message brokers deployed in all management systems 110. Each message broker that receives the queue inspection request identifies the device queue and returns a response (e.g., in the form of a 2-tuple) indicating a quantity of consumers associated with the device queue and a quantity of requests in the device queue (e.g., err=getDestination(msg.hdr.did)=nil is False). Once the ORA collects responses from the message brokers in all management systems 110, the ORA checks a total quantity of consumers of the device queue at all management systems 110. If this quantity is more than one, it means that client device 105 is actively connected at one of the management systems 110, and there is a DRA that is moving requests from the device queue in a management system 110, that is different from the current connection management system 110 of client device 105, towards a management system 110 to which client device 105 is connected. In order to respect the time-based total ordering of requests, the ORA backs off for a reasonable random amount of time, and repeats the device queue status check. The back-off is repeated until the total quantity of consumers of the device queue across all management systems 110 is at most one. This state is considered as steady by the ORA. In some implementations, the attempt by the ORA to attain time-based total ordering of requests issued towards client device 105 via device queue status checks is a best effort approach, and may not guarantee a time-based total ordering of the requests.

If steady state is attained, and the total quantity of consumers of the device queue across all management systems 110 is zero, this may indicate that client device 105 is currently not connected to any of the management systems 110 (e.g., err=getDestination(msg.hdr.did)=nil is True). In this case, the ORA checks if there exists a device queue with at least one request in a collected response (e.g., clr, err=processMessage(msg)). If so (e.g., err=processMessage (msg)=True), the ORA selects the management system 110 that has the device queue with delayed requests as the destination for the request (e.g., err=publish(msg, dst, outbound)). If not (e.g., err=processMessage(msg)=False), this indicates that there are no existing requests with pending delivery to the intended client device 105 in the overall deployment. As the request currently being processed is going to be the first delayed request, the ORA concludes the process by selecting the local management system 110 as the destination for the request (e.g., nackAndRequeue(msg)). If the total quantity of consumers of the device queue across all management systems 110 is one after the steady state is attained, a client device 105 may be connected at one management system 110 and all pending requests may be routed to the one management system 110. Therefore, the ORA selects a management system 110 associated with a connection as the destination. If queue inspection responses are not properly collected (e.g., err=publish(msg, dst, outbound)=nil is True), the ORA sends a negative acknowledgement (e.g., ack(msg)) for the request to the local message broker with a directive to requeue the message for reprocessing at a later time, and proceeds with receiving the next request from the local outbound queue.

Assessment of the status of a device queue on all management systems 110 may assume that message brokers on all management systems 110 respond to the queue inspection requests in a reasonable amount of time. However, routing agents can easily experience intermittent connection losses with any of the message brokers on any of the management systems 110. If such an assumption is not plausible for a given application, device queue assessment may be modified to work with responses from a portion of the message brokers if all responses are not collected after a certain amount of time.

If the request processing flow fails, the ORA may send a negative acknowledgement (e.g., nackAndRequeue(msg)) for the request to the local message broker (e.g., msg=consume(outbound)) with a directive to requeue the message for reprocessing at a later time, and may receive the next request from the local outbound queue. Otherwise, the ORA may attempt to route the request to the selected destination message broker's outbound queue. If the attempt fails, the ORA may send a negative acknowledgement (e.g., nackAndRequeue(msg)) for the request to the local message broker with a directive to requeue the message for reprocessing at a later time, and may proceed with receiving the next request from the local outbound queue. If the attempt is successful, the ORA checks the cache delete flag. If the flag is set, the ORA attempts to delete the record associated with the flow identification of the request (e.g., deleteFromCache(msg.hdr.flowID)). Regardless of the result of the attempt, it sends an acknowledgement (e.g., ack(msg)) for the request to the local message broker.

Adding a record to the local cache may be carried out before a request is routed, whereas removing a record from the local cache may be carried out after a request is routed. As a system may need to have a record of a remote source in a request-response flow, the logical flow of the ORA may guarantee that the routing occurs if the request-response flow associated with a request is successfully recorded. On the other hand, deletion of a locally stored cache record may be a precautionary operation to save memory and storage of the cache. Therefore, a deletion operation may be carried out once the request is successfully routed. In addition, as most caching mechanisms may support time-based expiry of created records, old or stale records may be automatically removed from the cache after a time period defined by the message processor. As a result, impacts of failed deletion operations may be trivially mitigated.

As shown in FIG. 1G, after the destination is selected, the ORA may follow a decision process (e.g., as indicated by a decision tree shown in FIG. 1G) to decide any further processing actions on the request before forwarding the request to the selected destination. The decision process may use the source header, the delayed header, and the flow identification header of the request, as well as a previously selected destination.

As shown in FIG. 1G, if the delayed header of the request is not set (e.g. Delayed is False) and the source of the request is remote (e.g., Source is local is False), the request may have been routed to the ORA from an ORA of another management systems 110 and this is the first time the request is being processed locally for routing purposes. In this case, if the selected destination message broker is local (e.g., Destination is local is True), the origin of the request needs to be recorded in order for the local inbound routing agent to successfully route the response to the origin when the request arrives from the client device 105. The recording of the request is carried out by adding an entry to a local key-value cache with the flow identification of the request as the key and the source of the request as the value. If the recording operation fails for any reason, the message processing flow terminates with an error specifying that reason. On the other hand, if the selected destination message broker is also remote (e.g., Destination is local is False), this means that there is no need to record the source of the request in the local cache, as the ORA is merely routing a request from one remote management system 110 to another management system 110 along with the responsibility to route the response associated with the request to the correct origin.

If the delayed header of the request is not set (e.g., Delayed is False), and the source of the request is local (e.g., Source is local is True), the request may have originated from a management system 110 of the ORA and this is the first time the request is being processed locally for routing purposes. In this case, regardless of the selected destination message broker being local or remote, there is no need to further process the request.

If the delayed header of the request is set (e.g., Delayed is True), and the source of the request is remote (e.g., Source is local is False), the request may have been routed to a management system 110 of the ORA from an ORA on another management system 110 and this is at least the second time the request is being processed by the ORA consecutively without being routed to another management system 110. In this case, if the selected destination message broker is also remote (e.g., Destination is local is False), the ORA may be routing a request from one remote management system 110 to another management system 110 along with the responsibility to route the response associated with the request to the correct origin. However, as this is at least the second time the request is being processed in the ORA consecutively without being routed to another management system 110, the request-response flow was potentially recorded in the local cache. Accordingly, the ORA sets a flag to indicate that this record can be cleared from the local cache after delivery of the request to the selected destination message broker. In addition, the delayed header of the request may be reset for further use by the ORA at the management system 110 of the destination message broker. On the other hand, if the selected destination message broker is local (e.g., Destination is local is True), the locally cached request-response record as well as the delayed header of the request may be valid as the request is not leaving the local management system 110. Therefore, there is no need to further process the request.

If the delayed header of the request is set (e.g., Delayed is True), and the source of the request is local (e.g., Source is local is True), the request may have originated from the message processor at the management system 110 of the ORA and this is at least the second time the request is being processed locally for routing purposes. As the source is local, there can be no local cached records of the request-response flow associated with the request, and regardless of the selected destination message broker (e.g., Destination is local is True), there is no need for recording the request-response flow associated with the request. However, if the request's new destination is selected as remote (e.g., Destination is local is False) and the request is not delayed in the routing context of the remote management system 110, the ORA may unset the delayed header of the request.

As shown in FIG. 1H, in some implementations, a modification may be made to the process of selecting a destination message broker for a given request. The ORA may perform a device queue status check every time a request is processed, which may cause a certain amount of queue inspection request traffic regardless of the queue inspection requests and responses being lightweight. The device queue status check may be relaxed in order to reduce queue inspection traffic between management systems 110, as set forth in FIG. 1H. When the ORA receives a request with a delayed header that is not set and a source header set as remote (e.g., msg.hdr.src=localSiteId), the ORA can bypass the device queue status check (e.g., err=storeInCache (msg.hdr.flowId, msg.hdr.src)=nil or dst, err=getDestination (msg.hdr.did)=nil is False) and directly route the request to the device queue on a local message broker. Thus, when a request is routed to an ORA from another ORA at a remote location for a first time, the local processing of the request may assume that a client device 105 is locally connected without any further global checks.

As shown in FIG. 1I, a routing layer of each management system 110 may include an IRA. The IRA may intercept messages from the inbound queue served by the message broker on a local management system 110 and may determine as to which management system 110 a response to a request should be delivered. Based on the determination, the IRA can either route the response to the control queue in the local management system 110 (e.g., as a final destination for a response) to be retrieved and processed by the message processor, or can route the message to the inbound queue of a remote management system 110 to be retrieved by an IRA of the remote management system 110. In some implementations, the IRA may interact with the cache located at the local management system 110.

As shown in FIG. 1J, and by reference number 135, the IRA of second management system 110-2 may receive, from second client device 105-2, a response to the request from first client device 105-1. For example, the inbound queue of second management system 110-2 may receive the response from second client device 105-2, and the IRA of second management system 110-2 may retrieve the response from the inbound queue of the second management system 110-2.

As further shown in FIG. 1J, and by reference number 140, the IRA of first management system 110-1 may receive, from the IRA of second management system 110-2, the response received from second client device 105-2. For example, the IRA of second management system 110-2 may provide the response to the inbound queue of first management system 110-1, and the inbound queue of first management system 110-1 may provide the response to the IRA of first management system 110-1.

As further shown in FIG. 1J, and by reference number 145, the IRA of first management system 110-1 may provide, to first client device 105-1, the response received from second client device 105-2. For example, the IRA of first management system 110-1 may provide the response to the control queue of first management system 110-1. The control queue of first management system 110-1 may provide the response to first client device 105-1, via the message processor of first management system 110-1.

As shown in FIG. 1K, an IRA may follow a logical flow throughout the process of routing responses. IRAs across all management systems 110 may collaboratively deliver responses from client devices 105 to client devices 105 originating requests associated with the responses, regardless of management systems 110 to which originating client devices 105 are connected. This may be accomplished by the IRAs communicating with each other by routing responses towards each other IRA until originating client devices 105 of requests are reached. An IRA may route a response to another IRA by publishing the request to the inbound queue located at and served by the message broker of a management system 110 associated with the other IRA.

Once successfully initiated, the IRA receives responses from the inbound queue served by the local message broker (e.g., msg=consume(inbound)). Upon receiving a response, the IRA attempts to read a record associated with a value of a flow identification header from a local cache (e.g., rcrd, err=readFromCache(msg.hdr.flowId)). As described above, this record is stored by the local ORA while routing the request towards client device 105. If the attempt fails (e.g., err=readFromCache(msg.hdr.flowId)=nil is False), the IRA sends a negative acknowledgement (e.g., nackAndRequeue (msg)) for the response to the local message broker with a directive to requeue the message for reprocessing at a later time, and proceeds with receiving the next device response. If the attempt succeeds (e.g., err=readFromCache(msg.hdr-.flowId)=nil is True) but a record associated with the flow identification does not exist (e.g., rcrd=nil is True), which indicates that the local management system 110 of the IRA is the origin of the request associated with the response being processed, the IRA attempts to route the response to the local control queue to be retrieved by the local message processor (e.g., err=publish(msg, local, control)). If the attempt fails (e.g., err=publish(msg, local, control)=nil is False), the IRA sends a negative acknowledgement (e.g., nackAndRequeue(msg)) for the response to the local message broker with a directive to requeue the response for reprocessing at a later time, and proceeds with receiving the next device response. Otherwise (e.g., err=publish(msg, local, control)=nil is True), the IRA sends an acknowledgement (e.g., ack(msg)) to the local message broker, and proceeds with receiving the next device response. If a record exists (e.g., rcrd=nil is False), the origin of the request response is remote and the IRA reads the origin from the record (e.g., err=publish(msg, rcrd.src, inbound)), and attempts to route the response to the message broker's inbound queue at the origin. If the attempt fails (e.g., err=publish(msg, rcrd.src, inbound)=nil is False), the IRA sends a negative acknowledgement (e.g., nackAndRequeue (msg)) for the response to the local message broker with a directive to requeue the response for reprocessing at a later time, and proceeds with receiving the next device response. Otherwise (e.g., err=publish(msg, rcrd.src, inbound)=nil is True), the IRA attempts to delete the request-response flow record from the local cache (e.g., deleteFromCache (msg.hdr.flowID)), and regardless of failure or success, sends an acknowledgement (e.g., ack(msg)) to the local message broker, and proceeds with receiving the next device response. As noted above, deletion of a record from the local cache is carried out after the response is successfully routed. As in the case of the ORA process flow, deletion of a locally stored cache record is a precautionary operation to save memory and storage on the cache, as any undeleted request-response flow record is harmless within the context of routing operations.

As shown in FIG. 1L, the routing layer of each management system 110 may employ a DRA. The DRA may detect device connections at remote management systems 110 by receiving messages from notification queues located at each remote management system 110. When a connection of a client device 105 at a remote management system 110 is detected, the DRA may route any requests that were previously sent to client device 105, but not delivered, to the outbound queue in the local management system 110 in order to reinitiate the delivery of the requests by the local ORA.

As shown in FIG. 1M, and by reference number 115, first management system 110-1 may receive, from first client device 105-1, a request for information from second client device 105-2. As further shown in FIG. 1M, and by reference number 150, the request may not be initially delivered to second management system 110-2 associated with second client device 105-2. For example, the request may not be initially delivered to second management system 110-2 due to second client device 105-2 not being connected to second management system 110-2, second client device 105-2 and/or second management system 110-2 being unavailable, and/or the like.

As further shown in FIG. 1M, and by reference number 155, the DRA of first management system 110-1 may receive, from second management system 110-2, a notification of availability. For example, when second client device 105-2 connects with second management system 110-2, the notification queue of second management system 110-2 may provide, to the DRA of first management system, a notification message indicating that second client device 105-2 is connected to second management system 110-2 and available to receive requests.

As further shown in FIG. 1M, and by reference number 160, first management system 110-1 may route the delayed request to second management system 110-2. For example, when the DRA receives the notification of availability, the DRA of first management system 110-1 may route the request, that was initially not delivered, to the outbound queue in first management system 110-1 in order to reinitiate the delivery of the request by the ORA of first management system 110-1. The ORA of first management system 110-1 may route the delayed request to the ORA of second management system 110-2.

As shown by reference number 165, second management system 110-2 may route the request to second client device 105-2. For example, the ORA of second management system 110-2 may provide the request to the device queue (e.g., device 2) of second management system 110-2. The device queue may then route the request to second client device 105-2, via the protocol layer.

As shown in FIG. 1N, a DRA may follow a logical flow throughout the process of routing. DRAs across all management systems 110 may be responsible for reinitiating the delivery of delayed requests to client devices 105 in collaboration with local ORAs. A delayed request may be a request that was previously not delivered to an intended client device 105, possibly due to client device 105 disconnection, and may be delivered when client device 105 reconnects with a management system 110.

Once successfully initiated, the DRA may receive messages from notification queues with message brokers located at remote management systems 110. The DRA may be notified as soon as a client device 105 connects at any of the remote management systems 110 via a message placed in a notification queue by the protocol layer. Upon receiving a connection notification from one of the remote management systems 110 (e.g., msg=consume(notificationQueues)), the DRA may extract the device identification header in the connection notification (e.g., nofm, err=getNumberOfDelayedMessages(msg.did)). The extracted value is then used to construct the name of the device queue. The constructed queue name is enveloped in a queue inspection request and sent to the local message broker. The local message broker returns a response (e.g., in the form of a 2-tuple) indicating a quantity of consumers of the device queue and a quantity of requests in the device queue. If the DRA fails to get a response in a reasonable period of time (e.g., err=getNumberOfDelayedMessages (msg.did)=nil is False), the DRA sends a negative acknowledgement (e.g., nackAndRequeue(msg)) for the response to the local message broker with a directive to requeue the message for reprocessing at a later time, and proceeds with receiving the next delayed request from the device queue.

Once the DRA gets a response (e.g., nofm), the DRA checks the total quantity of requests in the device queue. If the value is zero (e.g., nofm==0 is True), the DRA sends an acknowledgement (e.g., ack(msg)) to the remote message broker through which the DRA received the connection notification, and proceeds with receiving the next message from notification queues at the remote management systems 110. If the value is not zero (e.g., nofm==0 is False), then at least one delayed request to a recently connected client device 105 is previously not delivered and the DRA starts receiving from the device queue until the queue has no delayed requests left (e.g., pmsg=consumeOne(msg.did)). Upon receiving each delayed request, the DRA sets a delayed header (e.g., pmsg.hdr.delayed=true), and attempts to route the modified request to the local message broker's outbound queue to be retrieved by the local ORA and rerouted (e.g, err=publish(pmsg, local, outbound)). If the attempt fails (e.g., err=publish(pmsg, local, outbound)=nil is False), the DRA sends a negative acknowledgement (e.g., nackAndRequeue(pmsg)) for the response to the local message broker with a directive to requeue the message for reprocessing at a later time, and proceeds with receiving the next delayed request from the device queue. If the attempt succeeds (e.g., err=publish(pmsg, local, outbound)=nil is True), the DRA sends an acknowledgement (e.g., ack (pmsg)) for the delayed request to the local message broker, and proceeds with receiving the next delayed request from the device queue. Once the device queue with delayed messages is completely reviewed and all delayed messages are routed to the local message broker's outbound queue, the DRA sends an acknowledgement to the remote message broker through which the DRA received the connection notification, and proceeds with receiving the next message from its connection notification queues at the remote management systems 110.

In this way, several different stages of the process for routing end-to-end request-response flows for client devices connected to geographically distributed management systems are automated, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that routes end-to-end request-response flows for client devices connected to geographically distributed management systems in the manner described herein. Finally, the process for routing end-to-end request-response flows for client devices connected to geographically distributed management systems conserves computing resources, networking resources, and/or the like that would otherwise be wasted in generating requests that are never received, processing requests that are never received, generating responses that are never received, processing responses that are never received, and/or the like.

As indicated above, FIGS. 1A-1N are provided merely as examples. Other examples may differ from what was described with regard to FIGS. 1A-1N. The number and arrangement of devices and networks shown in FIGS. 1A-1N are provided as an example. In practice, there may be additional devices and/or networks, fewer devices and/or networks, different devices and/or networks, or differently arranged devices and/or networks than those shown in FIGS. 1A-1N. Furthermore, two or more devices shown in FIGS. 1A-1N may be implemented within a single device, or a single device shown in FIGS. 1A-1N may be implemented as multiple, distributed devices. Additionally, or alternatively, a set of devices (e.g., one or more devices) of FIGS. 1A-1N may perform one or more functions described as being performed by another set of devices of FIGS. 1A-1N.

Figure 2:
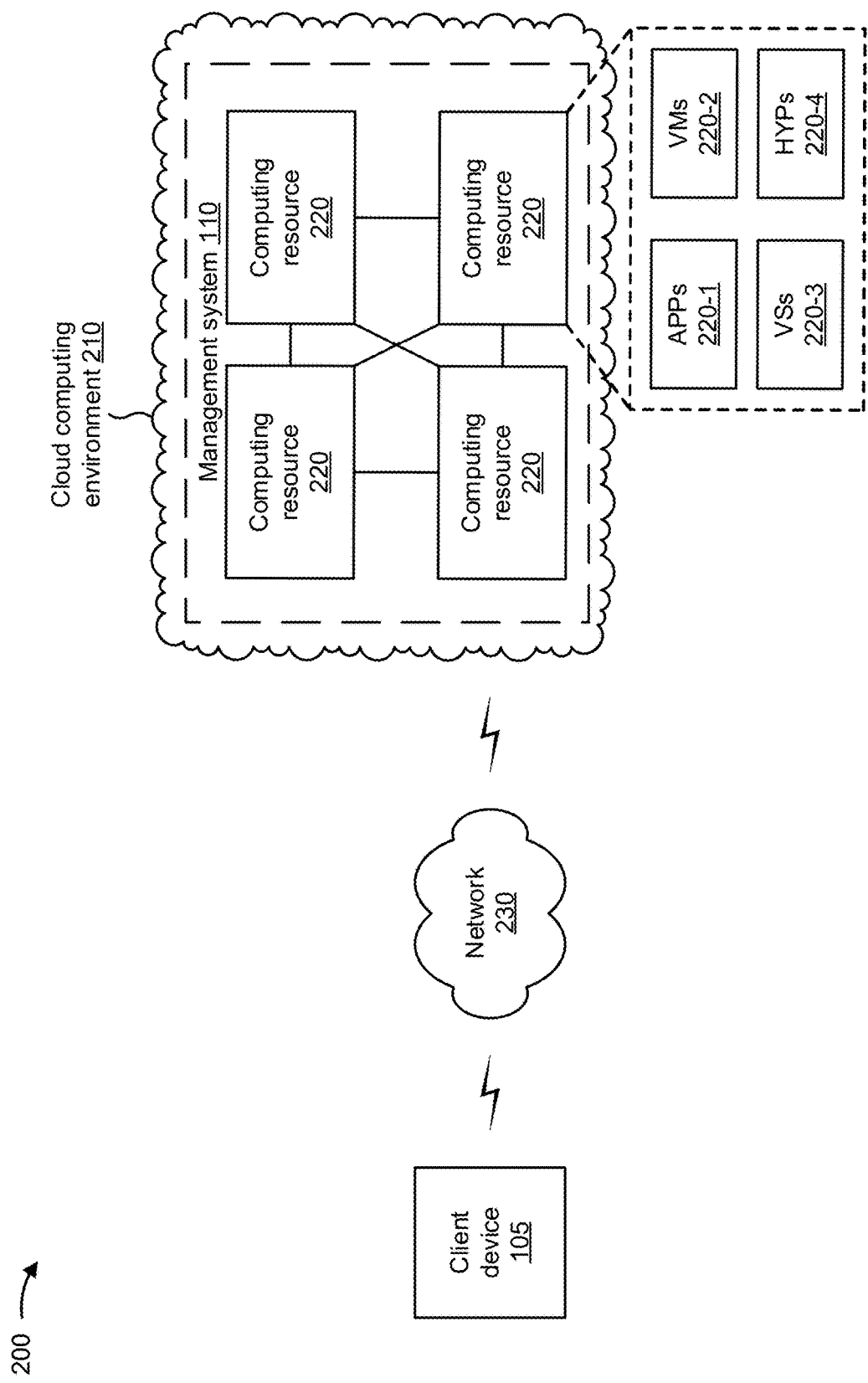
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include client device 105, management system 110, and a network 230. Devices of environment 200 may interconnect via wired connections, wireless connections, or a combination of wired and wireless connections.

Client device 105 includes one or more devices capable of receiving, generating, storing, processing, and/or providing information, such as information described herein. For example, client device 105 may include a mobile phone (e.g., a smart phone, a radiotelephone, and/or the like), a laptop computer, a tablet computer, a desktop computer, a handheld computer, a set-top box, a gaming device, a wearable communication device (e.g., a smart watch, a pair of smart glasses, a heart rate monitor, a fitness tracker, smart clothing, smart jewelry, a head mounted display, and/or the like), a device with a sensor (e.g., a light sensor, a temperature sensor, a power sensor, a speed sensor, an acceleration sensor, a location sensor, a direction sensor, a pressure sensor, a humidity sensor, and/or the like), or a similar type of device. In some implementations, client device 105 may receive information from and/or transmit information to management system 110.

Management system 110 includes one or more devices that provide end-to-end request-response flow routing for client devices 105 connected to geographically distributed management systems 110. In some implementations, management system 110 may be designed to be modular such that certain software components may be swapped in or out depending on a particular need. As such, management system 110 may be easily and/or quickly reconfigured for different uses. In some implementations, management system 110 may receive information from and/or transmit information to one or more client devices 105.

In some implementations, as shown, management system 110 may be hosted in a cloud computing environment 210. Notably, while implementations described herein describe management system 110 as being hosted in cloud computing environment 210 (e.g., a data center), in some implementations, management system 110 may not be cloud-based (i.e., may be implemented outside of a cloud computing environment) or may be partially cloud-based.

Cloud computing environment 210 includes an environment that hosts management system 110. Cloud computing environment 210 may provide computation, software, data access, storage, etc., services that do not require end-user knowledge of a physical location and configuration of system(s) and/or device(s) that host management system 110. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host management system 110. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by client device 105. Application 220-1 may eliminate a need to install and execute the software applications on client device 105. For example, application 220-1 may include software associated with management system 110 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of client device 105 or an operator of management system 110), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. In some implementations, network 230 may receive information from and/or transmit information to client device 105 and/or management system 110.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
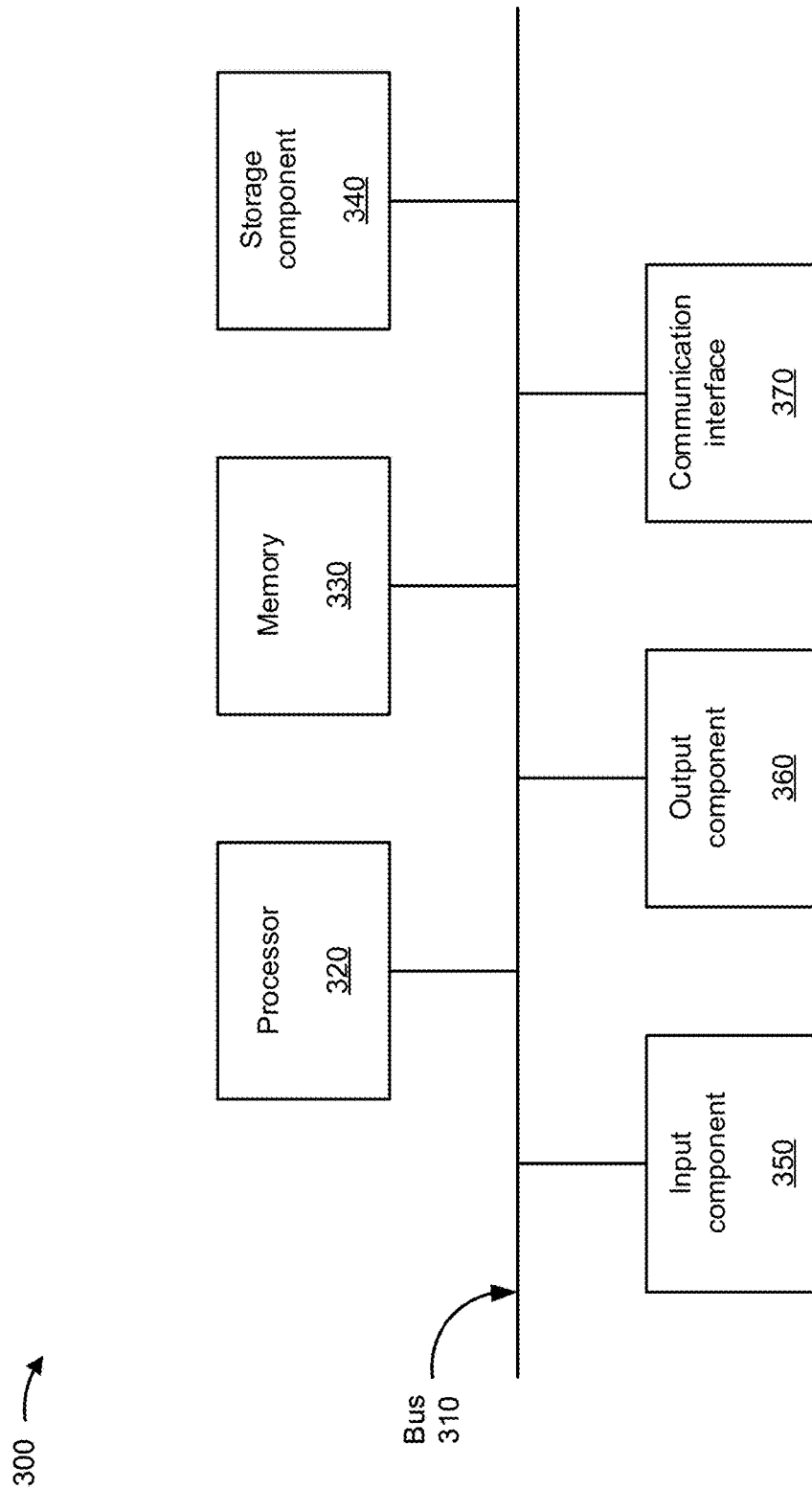
FIG. 3 is a diagram of example components of one or more devices of FIG. 2.

FIG. 3 is a diagram of example components of a device 300. Device 300 may correspond to client device 105, management system 110, and/or computing resource 220. In some implementations, client device 105, management system 110, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
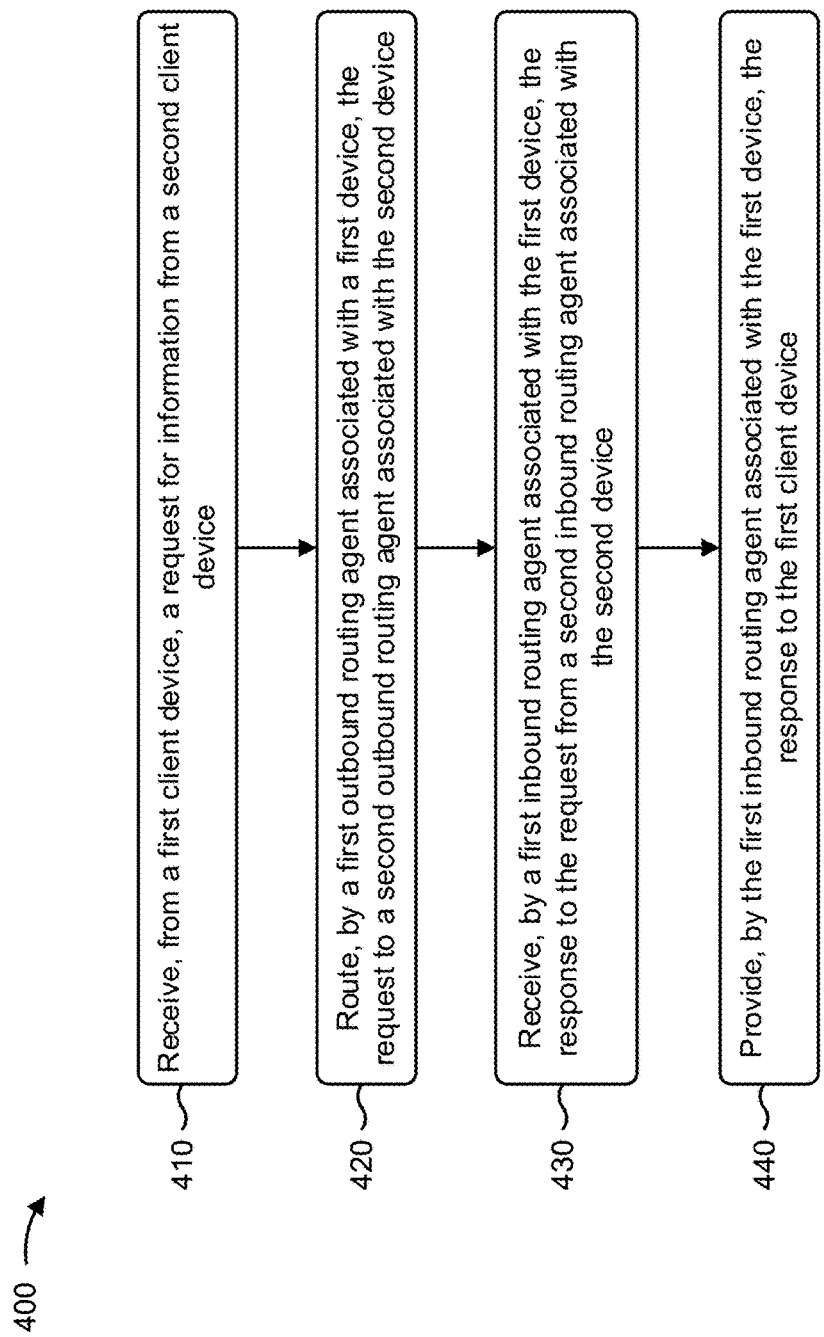
FIG. 4 is a flow chart of an example process for end-to-end request-response flow routing for geographically distributed client devices.

FIG. 4 is a flow chart of an example process 400 for end-to-end request-response flow routing for client devices connected to geographically distributed management systems. In some implementations, one or more process blocks of FIG. 4 may be performed by a device (e.g., management system 110). In some implementations, one or more process blocks of FIG. 4 may be performed by another device or a group of devices separate from or including the device, such as a client device (e.g., client device 105).

As shown in FIG. 4, process 400 may include receiving, from a first client device, a request for information from a second client device, wherein the second client device is connected to a second device that is geographically separated from the first device, and wherein the first device is hosted in a first cloud computing environment and the second device is hosted in a second cloud computing environment (block 410). For example, the first device (e.g., using computing resource 220, processor 320, communication interface 370, and/or the like) may receive, from a first client device, a request for information from a second client device, as described above. In some implementations, the second client device may be connected to a second device that is geographically separated from the first device. In some implementations, the first device may be hosted in a first cloud computing environment and the second device may be hosted in a second cloud computing environment. In some implementations, the first device may include a first management system and the second device may include a second management system.

As further shown in FIG. 4, process 400 may include routing, via a first outbound routing agent, the request to a second outbound routing agent associated with the second device, wherein the second outbound routing agent routes the request to the second client device, and wherein the request causes the second client device to generate a response to the request (block 420). For example, the first device (e.g., using computing resource 220, processor 320, memory 330, and/or the like) may route, via a first outbound routing agent associated with the first device, the request to a second outbound routing agent associated with the second device, as described above. In some implementations, the second outbound routing agent may route the request to the second client device, and the request may cause the second client device to generate a response to the request.

As further shown in FIG. 4, process 400 may include receiving, via a first inbound routing agent, the response to the request from a second inbound routing agent associated with the second device (block 430). For example, the first device (e.g., using computing resource 220, processor 320, communication interface 370, and/or the like) may receive, via a first inbound routing agent associated with the first device, the response to the request from a second inbound routing agent associated with the second device, as described above. In some implementations, the first outbound routing agent and the first inbound routing agent may be associated with a first routing layer of the first device, and the second outbound routing agent and the second inbound routing agent may be associated with a second routing layer of the second device.

As further shown in FIG. 4, process 400 may include providing, via the first inbound routing agent, the response to the first client device, wherein the response includes the information requested by the request (block 440). For example, the first device (e.g., using computing resource 220, processor 320, memory 330, storage component 340, communication interface 370, and/or the like) may provide, via the first inbound routing agent, the response to the first client device, as described above. In some implementations, the response may include the information requested by the request.

Process 400 may include additional implementations, such as any single implementation or any combination of implementations described below and/or in connection with one or more other processes described elsewhere herein.

In some implementations, when the request is delayed in being routed to the second outbound routing agent associated with the second device due to unavailability of the second device, process 400 may include receiving, from the second device, a notification indicating that the second device is available, and routing, via a first delayed routing agent, the request to a second delayed routing agent associated with the second device. The second delayed routing agent may route the request to the second client device, and the request may cause the second client device to generate the response.

In some implementations, the first delayed routing agent may be associated with a first routing layer of the first device, and the second delayed routing agent may be associated with a second routing layer of the second device.

In some implementations, process 400 may include storing the request, in an outbound queue associated with the first device, prior to routing the request to the second outbound routing agent associated with the second device. In some implementations, the outbound queue may communicate with the first outbound routing agent associated with the first device and the second outbound routing agent associated with the second device.

In some implementations, process 400 may include storing the response, in an inbound queue associated with the first device, prior to providing the response to the first client device. In some implementations, the inbound queue may communicate with the first inbound routing agent associated with the first device and the second inbound routing agent associated with the second device.

In some implementations, process 400 may include identifying the second outbound routing agent associated with the second device based on the request, and routing the request to an outbound queue associated with the second outbound routing agent based on identifying the second outbound routing agent.

In some implementations, process 400 may include receiving, by an inbound queue associated with the first device, the response to the request from the second inbound routing agent associated with the second device, wherein the first inbound routing agent may extract the response from the inbound queue.

In some implementations, process 400 may include associating, by the first outbound routing agent and based on the request, a device identification header with the request, wherein the device identification header is including information identifying the second client device.

In some implementations, process 400 may include associating, by the first outbound routing agent and based on the request, a flow identification header with the request, wherein the flow identification header is including information identifying routing decisions for the second device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a first device and from a first client device, a request for information from a second client device,
      wherein the first device includes a first layer, that processes the request for information, and a second layer that is a routing layer including a first outbound routing agent and a first inbound routing agent,
      wherein the second client device is connected to a second device that is geographically separated from the first device, and
      wherein the first device is hosted in a first cloud computing environment and the second device is hosted in a second cloud computing environment;
   routing, by the first outbound routing agent, the request to a second outbound routing agent associated with the second device,
      wherein the second outbound routing agent routes the request to the second client device, and
      wherein the request causes the second client device to generate a response to the request;
   receiving, by the first inbound routing agent, the response to the request from a second inbound routing agent associated with the second device; and
   providing, by the first inbound routing agent, the response to the first client device,
      wherein the response includes the information requested by the request.

2. The method of claim 1, wherein, the method further comprises:
   when the request is delayed in being routed to the second outbound routing agent associated with the second device due to unavailability of the second device,
      receiving, from the second device, a notification indicating that the second device is available; and
      routing, by a first delayed routing agent associated with the first device, the request to a second delayed routing agent associated with the second device,
         wherein the second delayed routing agent routes the request to the second client device, and
         wherein the request causes the second client device to generate the response.

3. The method of claim 2, wherein the second delayed routing agent is associated with a second routing layer of a communication protocol used by the second device.

4. The method of claim 1, wherein the second outbound routing agent and the second inbound routing agent are associated with a second routing layer of a communication protocol used by the second device.

5. The method of claim 1, further comprising:
storing the request, in an outbound queue associated with the first device, prior to routing the request to the second outbound routing agent associated with the second device.

6. The method of claim 5, wherein the outbound queue communicates with the first outbound routing agent and the second outbound routing agent.

7. The method of claim 1, wherein the first device is a first management system and the second device is a second management system.

8. A first device, comprising:
one or more memories; and
one or more processors configured to:
receive, from a first client device, a request for information from a second client device,
wherein the first device includes a first layer, that processes the request for information, and a second layer that is a routing layer including a first outbound routing agent and a first inbound routing agent,
wherein the second client device is geographically local to a second device, and
wherein the first device is hosted in a first data center and the second device is hosted in a second data center that is geographically separated from the first data center;
route, by the first outbound routing agent, the request to a second outbound routing agent associated with the second device,
wherein the second outbound routing agent routes the request to the second client device, and
wherein the request causes the second client device to generate a response to the request;
receive, by the first inbound routing agent, the response to the request from a second inbound routing agent associated with the second device,
wherein the second outbound routing agent and the second inbound routing agent are associated with a layer of the second device; and
provide, by the first inbound routing agent, the response to the first client device,
wherein the response includes the information requested by the request.

9. The first device of claim 8, wherein the one or more processors are further configured to:
store the response, in an inbound queue associated with the first device, prior to providing the response to the first client device.

10. The first device of claim 9, wherein the inbound queue communicates with the first inbound routing agent and the second inbound routing agent.

11. The first device of claim 8, wherein the one or more processors are further configured to:
identify the second outbound routing agent associated with the second device based on the request,
wherein the one or more processors, when routing the request to the second outbound routing agent associated with the second device, are configured to:
route the request to an outbound queue associated with the second outbound routing agent based on identifying the second outbound routing agent.

12. The first device of claim 8, wherein the one or more processors, when receiving the response to the request, are configured to:

receive, by an inbound queue associated with the first device, the response to the request from the second inbound routing agent associated with the second device,
wherein the first inbound routing agent extracts the response from the inbound queue.

13. The first device of claim 8, wherein the one or more processors are further configured to:
associate, by the first outbound routing agent and based on the request, a device identification header with the request,
wherein the device identification header includes information identifying the second client device.

14. The first device of claim 8, wherein the one or more processors are further configured to:
associate, by the first outbound routing agent and based on the request, a flow identification header with the request,
wherein the flow identification header includes information identifying routing decisions for the second device.

15. A non-transitory computer-readable medium storing instructions, the instructions comprising:
one or more instructions that, when executed by one or more processors of a first device, cause the one or more processors to:
receive, from a first client device, a request for information from a second client device,
wherein the first device includes a first layer, that processes the request for information, and a second layer that is a routing layer including a first outbound routing agent and a first inbound routing agent,
wherein the second client device is connected to a second device, and
wherein the first device is hosted in a first data center and the second device is hosted in a second data center that is geographically separated from the first data center;
route, by the first outbound routing agent, the request to a second outbound routing agent associated with the second device,
wherein the second outbound routing agent routes the request to the second client device, and
wherein the request causes the second client device to generate a response to the request;
receive, by an inbound queue associated with the first device, the response to the request from the second device;
extract, by the first inbound routing agent, the response from the inbound queue,
wherein the response is received from a second inbound routing agent associated with the second device; and
provide, by the first inbound routing agent, the response to the first client device,
wherein the response includes the information requested by the request.

16. The non-transitory computer-readable medium of claim 15, wherein, when the request is delayed in being routed to the second outbound routing agent associated with the second device due to unavailability of the second device, the instructions further comprise:
one or more instructions that, when executed by the one or more processors, cause the one or more processors to:

receive, from the second device, a notification indicating that the second device is available; and route, by a first delayed routing agent associated with the first device, the request to a second delayed routing agent associated with the second device, wherein the second delayed routing agent routes the request to the second client device, and wherein the request causes the second client device to generate the response.

17. The non-transitory computer-readable medium of claim 15, wherein at least one of:

the first layer is a protocol layer, or the second layer communicates with a control layer of the first device.

18. The non-transitory computer-readable medium of claim 15, wherein the instructions further comprise:

one or more instructions that, when executed by the one or more processors, cause the one or more processors to:

store the request, in an outbound queue associated with the first device, prior to routing the request to the second outbound routing agent associated with the second device, wherein the outbound queue communicates with the first outbound routing agent and the second outbound routing agent.

19. The non-transitory computer-readable medium of claim 15, wherein the instructions further comprise:

one or more instructions that, when executed by the one or more processors, cause the one or more processors to:

store the response, in an inbound queue associated with the first device, prior to providing the response to the first client device, wherein the inbound queue communicates with the first inbound routing agent and the second inbound routing agent.

20. The non-transitory computer-readable medium of claim 15, wherein the instructions further comprise:

one or more instructions that, when executed by the one or more processors, cause the one or more processors to:

identify the second outbound routing agent associated with the second device based on the request, wherein the one or more instructions, that cause the one or more processors to route the request to the second outbound routing agent associated with the second device, cause the one or more processors to:

route the request to an outbound queue associated with the second outbound routing agent based on identifying the second outbound routing agent.

* * * * *